United States Patent
Miyazawa et al.

(10) Patent No.: US 10,643,338 B2
(45) Date of Patent: May 5, 2020

(54) OBJECT DETECTION DEVICE AND OBJECT DETECTION METHOD

(71) Applicant: MITSUBISHI ELECTRIC CORPORATION, Tokyo (JP)

(72) Inventors: Kazuyuki Miyazawa, Tokyo (JP); Shunichi Sekiguchi, Tokyo (JP); Hideaki Maehara, Tokyo (JP); Yoshimi Moriya, Tokyo (JP); Akira Minezawa, Tokyo (JP); Ryoji Hattori, Tokyo (JP); Momoyo Nagase, Tokyo (JP); Tomoya Sawada, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 234 days.

(21) Appl. No.: 15/744,026

(22) PCT Filed: Dec. 2, 2015

(86) PCT No.: PCT/JP2015/083880
§ 371 (c)(1),
(2) Date: Jan. 11, 2018

(87) PCT Pub. No.: WO2017/094140
PCT Pub. Date: Jun. 8, 2017

(65) Prior Publication Data
US 2018/0204333 A1    Jul. 19, 2018

(51) Int. Cl.
*G06T 7/254* (2017.01)
*G06T 7/215* (2017.01)
(Continued)

(52) U.S. Cl.
CPC .......... *G06T 7/254* (2017.01); *G06K 9/00624* (2013.01); *G06K 9/00805* (2013.01);
(Continued)

(58) Field of Classification Search
CPC .......... G06K 9/00624; G06K 9/00805; G06K 9/4642; G06T 7/11; G06T 7/215;
(Continued)

(56) References Cited

U.S. PATENT DOCUMENTS 7,266,220 B2 *   9/2007   Sato ................... G06K 9/00805
                                                                340/937
9,445,057 B2 *   9/2016   May ........................ H04N 7/18
(Continued)

FOREIGN PATENT DOCUMENTS

JP       07-262375 A      10/1995
JP       2006-215655 A     8/2006
(Continued)

OTHER PUBLICATIONS

International Search Report for PCT/JP2015/083880 (PCT/ISA/210) dated Mar. 8, 2016.
(Continued)

*Primary Examiner* — Mekonen T Bekele
(74) *Attorney, Agent, or Firm* — Birch, Stewart, Kolasch & Birch, LLP

(57) ABSTRACT

An object detection device includes: an optical flow calculator to calculate an optical flow between images captured by the image capturer at different times; an evaluation value calculator to divide the image captured by the image capturer into areas, and calculate, for each divided area, an evaluation value by using the optical flows of pixels belonging to the divided area, the evaluation value indicating a measure of a possibility that the divided area is an object area representing part or whole of the object to be detected; and an area determinator to determine an area in an image, in which the object to be detected exists, by comparing the evaluation value of each divided area calculated by the evaluation value calculator with a threshold value.

6 Claims, 17 Drawing Sheets

(51) Int. Cl.
*G06K 9/46* (2006.01)
*G06K 9/00* (2006.01)
*G06T 7/269* (2017.01)
*G06T 7/11* (2017.01)

(52) U.S. Cl.
CPC ............ *G06K 9/4642* (2013.01); *G06T 7/11* (2017.01); *G06T 7/215* (2017.01); *G06T 7/269* (2017.01); *G06T 2207/10016* (2013.01); *G06T 2207/20021* (2013.01); *G06T 2207/30261* (2013.01)

(58) Field of Classification Search
CPC ............... G06T 7/254; G06T 7/269; G06T 2207/10016; G06T 2207/20021; G06T 2207/30261
See application file for complete search history.

(56) References Cited

U.S. PATENT DOCUMENTS

| | | | |
|---|---|---|---|
| 10,013,616 B2 * | 7/2018 | Gehrke | ............... H04N 7/183 |
| 2003/0210807 A1 * | 11/2003 | Sato | ............... G06K 9/00805 |
| | | | 382/104 |
| 2008/0212879 A1 | 9/2008 | Torii et al. | |
| 2010/0177932 A1 | 7/2010 | Yano | |
| 2011/0037853 A1 * | 2/2011 | Shiraishi | ............... G01S 13/931 |
| | | | 348/148 |
| 2011/0129017 A1 | 6/2011 | Oami et al. | |
| 2012/0275650 A1 | 11/2012 | Torii et al. | |
| 2013/0070847 A1 * | 3/2013 | Oami | ............... G06K 9/00744 |
| | | | 375/240.08 |
| 2014/0009615 A1 * | 1/2014 | Kiyohara | ............... H04N 7/18 |
| | | | 348/148 |
| 2015/0172582 A1 * | 6/2015 | Kiyohara | ........... G06K 9/00791 |
| | | | 348/322 |

FOREIGN PATENT DOCUMENTS

| | | |
|---|---|---|
| JP | 2007-18324 A | 1/2007 |
| JP | 2007-266652 A | 10/2007 |
| JP | 2008-146185 A | 6/2008 |
| JP | 2008-158774 A | 7/2008 |
| JP | 2009-157581 A | 7/2009 |
| JP | 2010-128947 A | 6/2010 |
| JP | 2010-160743 A | 7/2010 |
| WO | WO 2010/084739 A1 | 7/2010 |

OTHER PUBLICATIONS

Japanese Office Action issued in Japanese Patent Application No. 2016-552354 dated Dec. 5, 2016.

Taira et al., "A novel method for generating optical flow based on fusing visual information and camera motion", J. Fac. Sci. Tech., Seikei Univ., vol. 43, No. 2, (2006), pp. 87-93.

Zach et al., "A Duality Based Approach for Realtime TV-L$^1$ Optical Flow", total of 10 pages.

Extended European Search Report issued in European Application No. 15909770.8 dated Aug. 31, 2018.

* cited by examiner

OBJECT DETECTION DEVICE AND OBJECT DETECTION METHOD

TECHNICAL FIELD

The present invention relates to an object detection device and an object detection method for detecting an area in an image, in which an object to be detected exists.

BACKGROUND ART

Processing of detecting an object, such as a person or a car, from an image captured by a camera is an important technology applied to a vision sensor for robot or vehicle, an image monitoring system, or the like.

In detecting a desired object, discrimination processing, such as pattern recognition processing based on machine learning, is often used.

Specifically, a window that indicates a local area having an appropriate size is cut out from frames of images continuously captured by a camera, discrimination processing, such as pattern recognition processing, for the image in the window is executed, and it is determined whether an object exists within the window. By these processing, an area in the image in which the object to be detected exists is detected.

It is known that the discrimination processing, such as the pattern recognition processing, has a large amount of operation. In general, a position where an object exists in each frame of an image and a size of the object are unknown. Therefore, the discrimination processing, such as the pattern recognition processing, is continuously executed while slightly changing the size and the position of the window.

For the reason above, an enormous number of times of discrimination processing is needed per frame, resulting in an enormous operation amount.

In Patent Literature 1 below, in order to decrease the number of times of discrimination processing to reduce the operation amount, an object detection device is disclosed, which detects in advance pixels indicating large luminance change in a time direction as an object area and exclusively uses the detected object area as a target for the discrimination processing.

CITATION LIST

Patent Literature 1

JP 2007-18324 A (paragraph [0008], FIG. 1)

SUMMARY OF INVENTION

Since the conventional object detection device is configured as described above, the processing time to detect the object can be shortened by reducing the operation amount. However, such operation is premised on the condition where the camera remains stationary when capturing an image. The conventional object detection device cannot be applied to an image captured by a camera that is moving at the time of capture, like a camera mounted in a moving body such as a robot or an automobile, or a hand-held camera. Therefore, there is a problem that an area in an image, in which an object to be detected exists, cannot be accurately detected from the image which is captured while moving.

The present invention has been made to solve the above-described problem, and an object thereof is to provide an object detection device and an object detection method, each being capable of accurately detecting an area in which an object to be detected exists, even from an image captured while moving.

An object detection device according to the present invention is provided with an image capturer to continuously capture images; an optical flow calculator to calculate an optical flow between images captured by the image capturer at different times; and an object detector to detect, by using the optical flow calculated by the optical flow calculator, an area in an image, in which an object to be detected exists.

According to the present invention, the optical flow calculator to calculating an optical flow between images captured by an image capturer at different times is provided, and the object detector detects an area in an image in which an object to be detected exists by using the optical flow calculated by the optical flow calculator. Therefore, there is an effect to accurately detect the area in which the object to be detected exists from an image captured by the image capturer while moving.

DESCRIPTION OF EMBODIMENTS

Hereinafter, in order to describe the present invention in more detail, embodiments for implementing the present invention will be described with reference to the accompanying drawings.

Embodiment 1

Figure 1:
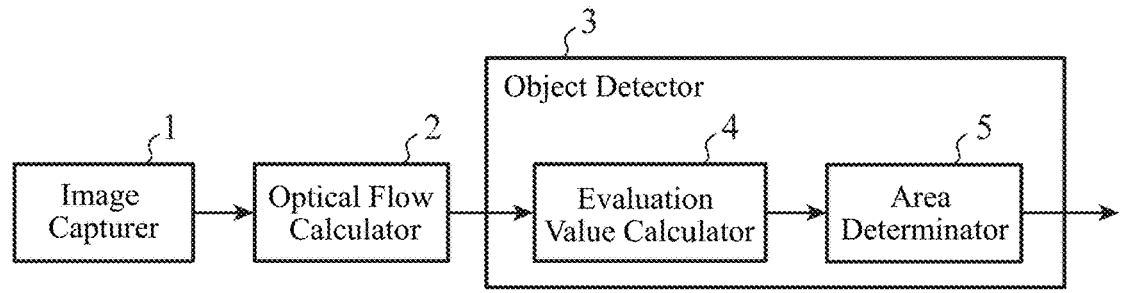
FIG. 1 is a structural diagram illustrating an object detection device according to Embodiment 1 of the present invention.
Figure 2:
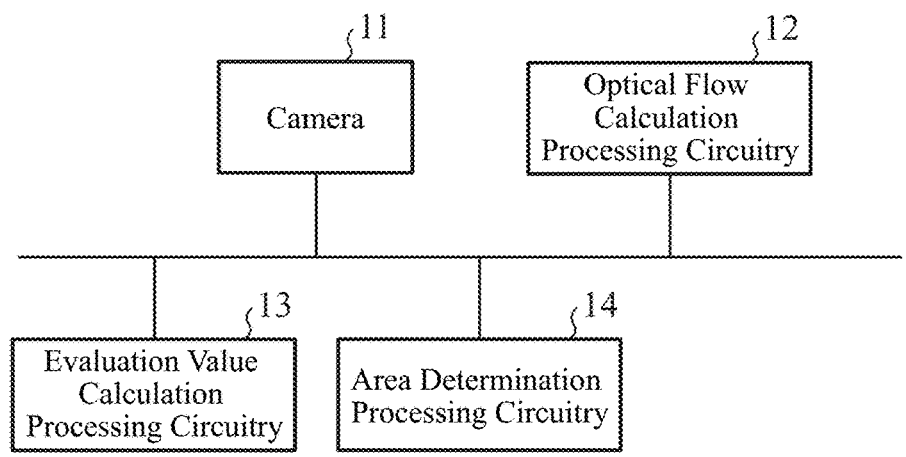
FIG. 2 is a hardware structural diagram illustrating the object detection device according to the Embodiment 1 of the present invention.

FIG. 1 is a structural diagram illustrating an object detection device according to Embodiment 1 of the present invention, and FIG. 2 is a hardware structural diagram illustrating the object detection device according to the Embodiment 1 of the present invention.

In FIG. 1 and FIG. 2, an image capturer 1 is realized by a camera 11 that is movable at the time of capture, such as a camera mounted on a vehicle or a robot or a hand-held camera, and continuously captures images. Image data of frames, which are the images continuously captured by the image capturer 1, is output to an optical flow calculator 2 in a subsequent stage.

The optical flow calculator 2 is realized by optical flow calculation processing circuitry 12 constituted by semiconductor integrated circuitry on which a central processing unit (CPU) is mounted or by a single-chip microcomputer, for example. The optical flow calculator 2 performs processing for calculating an optical flow between images captured at different times, that is, between two frames, by using the image data output by the image capturer 1.

Note that the optical flow represents, with a vector, motion of an object in a temporally continuous image. In order to calculate the optical flow between two frames, corresponding points of each object existing in the two frames are searched for, and after that, movement of the corresponding points between the two frames is represented by a vector. The object mentioned above is a moving object or a stationary object including a background.

An object detector 3 is realized by an evaluation value calculator 4 and an area determinator 5. The object detector 3 performs processing for detecting an area in an image, in which an object to be detected exists, by using an optical flow calculated by the optical flow calculator 2.

The evaluation value calculator 4 is realized by evaluation value calculation processing circuitry 13 constituted by semiconductor integrated circuitry on which a CPU is mounted or by a single-chip microcomputer. The evaluation value calculator 4 divides a frame, which is an image captured by the image capturer 1, into a plurality of areas. The evaluation value calculator 4 calculates, for each divided area by using optical flows for a plurality of pixels belonging to the divided area, an evaluation value indicating a measure of a possibility that the divided area is an object area that represents part or whole of the object to be detected.

The area determinator 5 is realized by area determination processing circuitry 14 constituted by semiconductor integrated circuitry on which a CPU is mounted or by a single-chip microcomputer. The area determinator 5 performs processing for determining the area in an image, in which the object to be detected exists, by comparing the evaluation value of each divided area calculated by the evaluation value calculator 4 with a threshold value.

In FIG. 1, each of the image capturer 1, the optical flow calculator 2, and the object detector 3, which is structural elements of the object detection device, is supposed to be realized by dedicated hardware. Alternatively, the optical flow calculator 2 and the object detector 3 may be realized by a computer.

Figure 3:
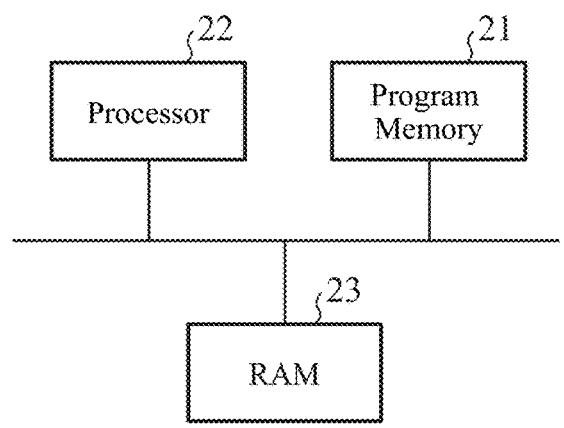
FIG. 3 is a hardware structural diagram, where an optical flow calculator 2 and an object detector 3 are realized by a computer.

FIG. 3 is a hardware structural diagram, where an optical flow calculator 2 and an object detector 3 are realized by a computer.

When the optical flow calculator 2 and the object detector 3 are realized by a computer, a program in which processing contents of the optical flow calculator 2 and the object detector 3 are described may be stored in a program memory 21 of the computer, and a processor 22 of the computer may execute the program stored in the program memory 21. Note that an execution result and an intermediate processing result of the program are appropriately stored in a random access memory (RAM) 23.

Figure 4:
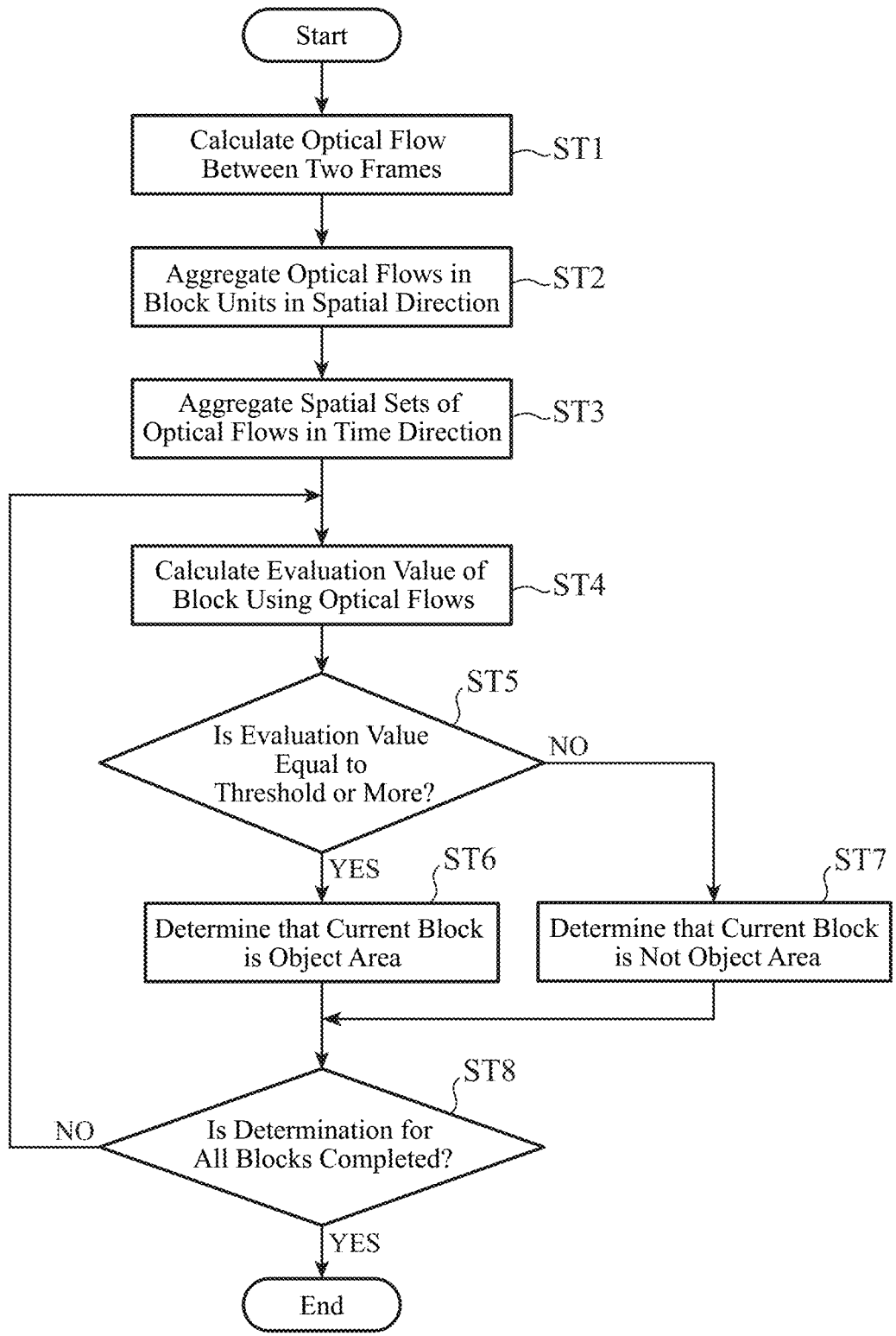
FIG. 4 is a flowchart illustrating processing contents of the optical flow calculator 2 and the object detector 3.

FIG. 4 is a flowchart illustrating processing contents of the optical flow calculator 2 and the object detector 3.

Next, an operation will be described.

The image capturer 1, which is realized by the camera 11 being movable at the time of capture, continuously captures images that temporally continue.

Specifically, assuming that an interval of image sampling is "t", the image capturer 1 captures a frame image every time when the time t passes, and outputs image data of the frame to the optical flow calculator 2.

The optical flow calculator 2 stores the image data of the frame every time receiving the image data of the frame from the image capturer 1, and calculates optical flows between arbitrary two frames by using the image data of the arbitrary two frames (step ST1 in FIG. 4). For example, optical flows between a latest frame and the previous one are calculated.

It is assumed that the optical flow calculator 2 is realized by a computer. In this case, by executing at the processor 22 the program stored in the program memory 21, the processor 22 stores the image data of the frame output by the image capturer 1 to the RAM 23 and calculates optical flows between the latest frame and the previous frame by using, for example, the image data of the latest frame and the previous one.

Figure 5:
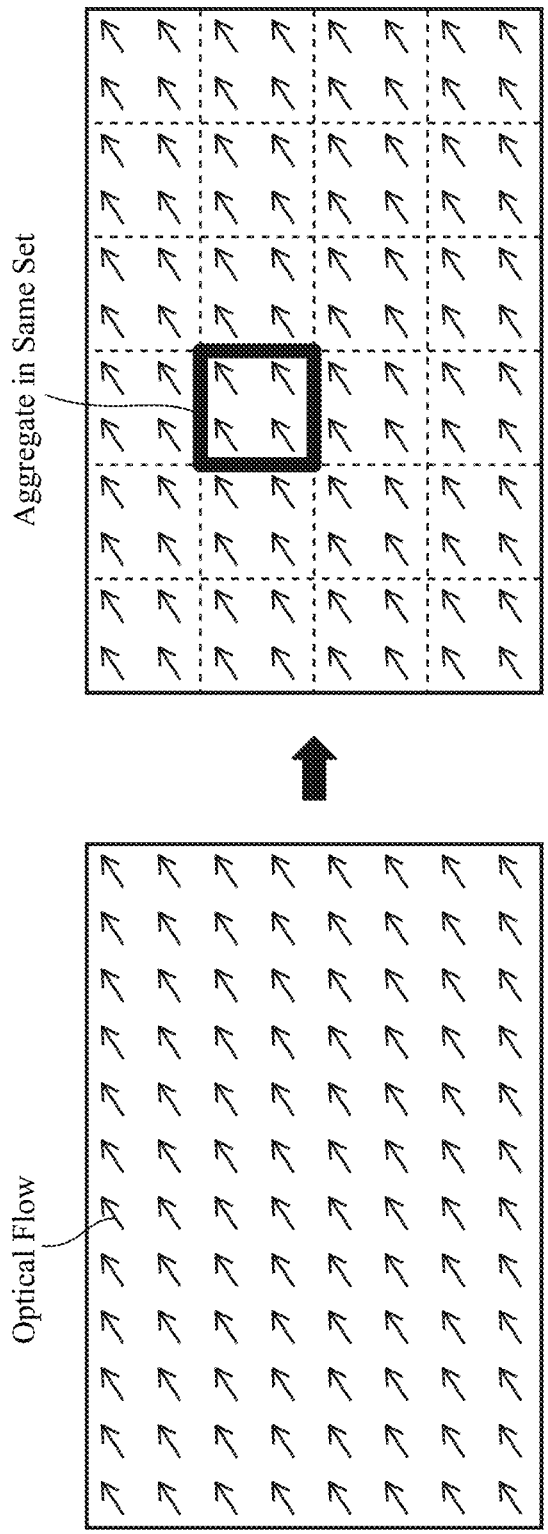
FIG. 5 is an explanatory diagram illustrating a calculation example of optical flows and an aggregation example of optical flows in a spatial direction.

FIG. 5 is an explanatory diagram illustrating a calculation example of optical flows and an aggregation example of optical flows in a spatial direction.

In the example of FIG. 5, an optical flow between the latest frame and the previous one is calculated for each of pixels constituting the frame, and the optical flows for 12×8 pixels are calculated.

In FIG. 5, the optical flow for each pixel is represented by a vector, a position of a base end of the vector indicates a pixel position in one frame before, and a position of a tip end of the vector indicates a pixel position in the latest frame. The positions of the base end and the tip end of the vector indicate corresponding points of the same part of an object.

The processing for calculating the optical flow is a well-known technology. For example, a method for calculating an optical flow is disclosed in Non-Patent Literature 1 below, and thus details of the processing for calculating the optical flow are omitted.

Non-Patent Literature 1

C. Zach, T. Pock and H. Bischof, "A Duality Based Approach for Realtime TV-L1 Optical Flow", In Proceedings of Pattern Recognition (DAGM), Germany, pp. 214-223, 2007

After the optical flow calculator 2 calculates the optical flows between the two frames, the object detector 3 detects, by using the optical flows, an area in the image in which the object to be detected exists.

Hereinafter, area detection processing by the object detector 3 will be specifically described.

After the optical flow calculator 2 calculates the optical flows between the two frames, the evaluation value calculator 4 of the object detector 3 divides the frame into a plurality of areas as illustrated in FIG. 5, and aggregates the optical flows along the spatial direction in units of blocks, each being the divided area (step ST2 in FIG. 4). In other words, the evaluation value calculator 4 generates, for each block, a set of optical flows of pixels belonging to the corresponding block.

In FIG. 5, it is assumed that the frame is divided into 6×4 areas, and each block being each individual divided area includes four optical flows.

The example is illustrated, in which each block has a fixed size of 2×2. The size of each block is not limited to a fixed one, but may be arbitrary sizes. In addition, the shape of each block is not limited to a rectangle.

After performing the aggregation of the optical flows along the spatial direction in units of blocks, the evaluation value calculator 4 calculates the evaluation value by using the optical flows of the pixels belonging to each block. The evaluation value indicates a measure of a possibility that each block is an object area that represents part or whole of the object to be detected.

However, a certain amount of errors may be included in the optical flow calculated by the optical flow calculator 2.

In order to calculate a highly accurate evaluation value even if such error is included in the optical flow, the evaluation value calculator 4 aggregates, along the time direction, spatial sets of optical flows of pixels in the blocks located at the same spatial position, out of the optical flows having different calculation times by the optical flow calculator 2, and thereby generates a larger set (step ST3 in FIG. 4), before calculating the evaluation value.

Only the optical flows at a single calculation time may be affected by the influence of errors in calculating the evaluation value. In contrast, directions of errors of the optical flows at different calculation times may be various directions. Therefore, by generating the set of the optical flows in the time direction, the errors of the plurality of optical flows at different calculation times are offset, and thereby the influence of the errors is reduced.

Figure 6:
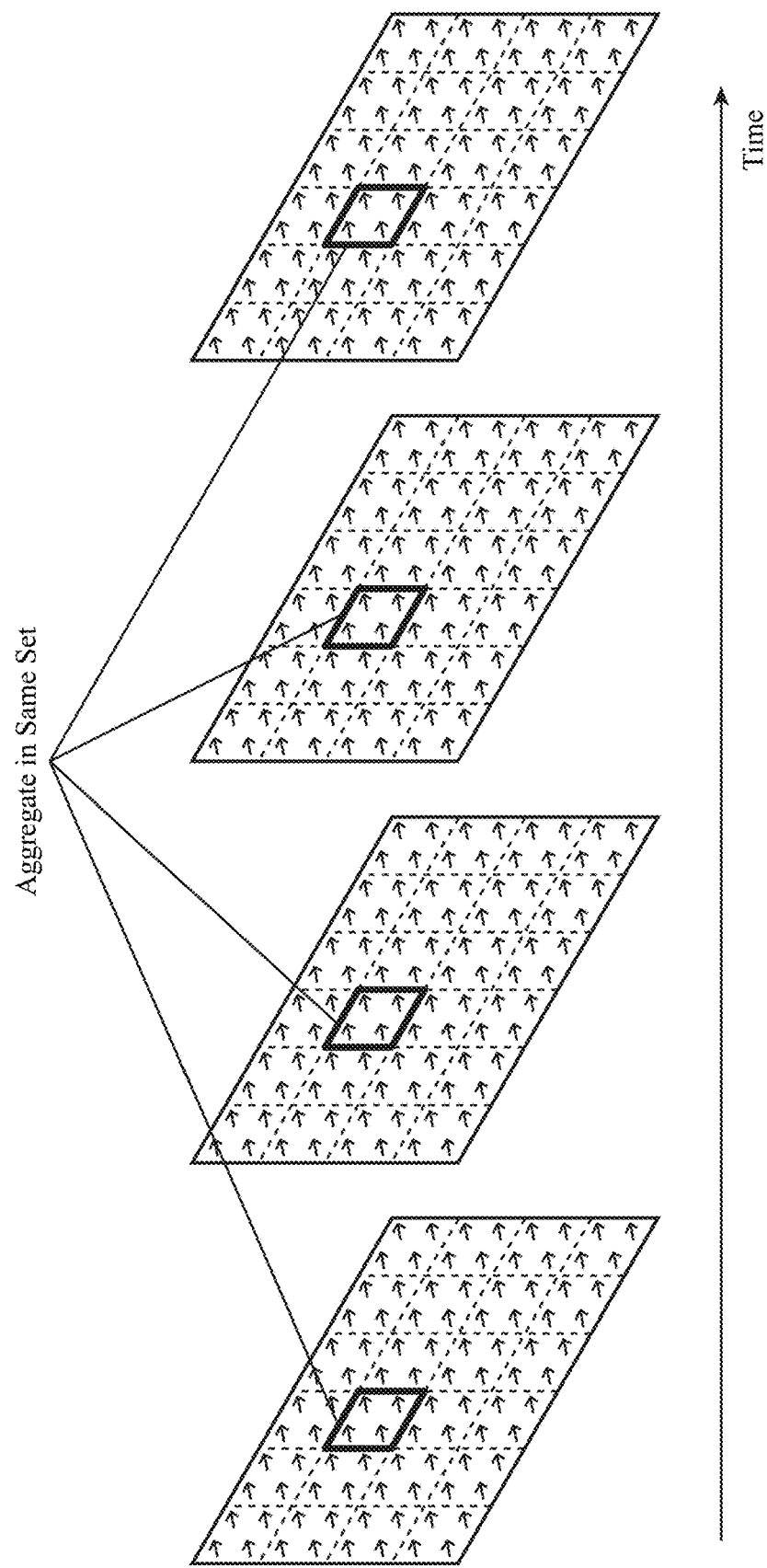
FIG. 6 is an explanatory diagram illustrating an example in which spatial sets of optical flows are aggregated in a time direction.

FIG. 6 is an explanatory diagram illustrating an example in which spatial sets of optical flows are aggregated in a time direction.

In FIG. 6, the example is illustrated, in which spatial sets of the optical flows at the same spatial position in four continuous optical flows are aggregated in the time direction. With the aggregation, a set of 4×4 (=16) optical flows is generated for one block located at the same spatial position.

The number of optical flows to be aggregated can be determined depending on, for example, a frame rate of the image, moving speeds of the camera 11 and the object to be detected.

After performing the aggregation of the space sets of the optical flows for the pixels belonging to the blocks in the time direction, the evaluation value calculator 4 calculates, for each block, an evaluation value indicating a measure of a possibility that the block is an object area representing part or whole of the object to be detected, by using the optical flows of the block aggregated in the time direction (step ST4 in FIG. 4).

Various measures can be suggested as the evaluation value indicating a measure of a possibility of being the object area. An example of an effective measure includes variation of optical flows. This is because, typically, while a set of stable optical flows with small variation is obtained in an object area in an image, a set of unstable optical flows with large variation is often obtained in an area other than the object area.

Therefore, by evaluating the variation of the optical flows included in the set, the set can be determined to belong to the object area when the variation is small, and the set can be determined to belong to an area other than the object area when the variation is large. Dispersion is known as an evaluation measure of the variation.

The evaluation value indicating a measure of a possibility of being an object area may be calculated in accordance with the following expression (1). Specifically, the evaluation value calculator 4 calculates, as characteristic amounts, dispersion of angles of the optical flows and dispersion of lengths of the optical flows from the optical flows included in the set, and thereby calculates the evaluation value from the dispersion of the angles and the dispersion of the lengths being the characteristic amounts.

[Expression 1]

$$\left(\frac{1}{N_o}\sum_{i \in O}(\theta_i - m_\theta)^2 + \frac{1}{N_o}\sum_{i \in O}(n_i - m_n)^2\right)^{-1} \quad (1)$$

In the expression (1), O denotes the set of the optical flows aggregated in the time direction, and $N_o$ denotes the number of elements included in the set of the optical flows.

$\theta_i$ is the angle of the i-th optical flow, and $n_i$ is the length of the i-th optical flow.

$m_\theta$ is an average value of the angles of the optical flows aggregated in the time direction, and $m_n$ is an average value of the lengths of the optical flows aggregated in the time direction.

The first term of the expression (1) indicates the dispersion of the angles of the optical flows, and the second term indicates the dispersion of the lengths of the optical flows.

Note that a larger evaluation value is obtained when the variation of the optical flows included in the set is smaller, and a smaller evaluation value is obtained when the variation of the optical flows included in the set is larger.

In the expression (1), the first term and the second term may be multiplied by a coefficient for correction.

The example has been described, in which the evaluation value calculator 4 calculates the evaluation value from dispersion of angles and dispersion of lengths of the optical flows included in the set. However, the calculation of the evaluation value is not limited to the calculation from the dispersion of the angles and the dispersion of the lengths of the optical flows. For example, as illustrated in the expression (2) below, the evaluation value may be calculated from a total of difference absolute values of the angles and a total of difference absolute values of the lengths with respect to arbitrary two optical flows belonging to the set O.

[Expression 2]

$$\left(\sum_{i,j \in O} |\theta_i - \theta_j| + \sum_{i,j \in O} |n_i - n_j|\right)^{-1} \quad (2)$$

In the expression (2), $\theta_j$ denotes the angle of the j-th optical flow, and $n_j$ denotes the length of the j-th optical flow.

Note that a larger evaluation value is calculated when the total of the difference absolute values of the angles and the lengths of the two optical flow is smaller, and a smaller evaluation value is calculated when the total of the difference absolute values of the angles and the lengths of the two optical flow is larger.

The set can be determined as belonging to the object area when the total of the difference absolute values is small, and the set can be determined as belonging to the area other than the object area when the total of the difference absolute values is large. Therefore, the total of the difference absolute values can be utilized for an effective measure, similarly to the dispersion of the optical flows.

When the total of the difference absolute values is calculated, calculation of an average value and square calculation are not included like the dispersion. Therefore, it is possible to perform the calculation at high speed because the operation amount is smaller than the case of calculating the dispersion.

The first term and the second term may be multiplied by a coefficient for correction.

After the evaluation value calculator 4 calculates the evaluation value for a certain block, the area determinator 5 of the object detector 3 compares the evaluation value with a preset threshold value. When the evaluation value is equal to or more than the threshold value (YES at step ST5 in FIG. 4), the area determinator 5 determines that the block is the object area representing part or whole of the object to be detected (step ST6).

On the other hand, when the evaluation value is less than the threshold value (step ST5: NO), the area determinator 5 determines that the block is not the object area representing part or whole of the object to be detected (step ST7).

The threshold value can be obtained by, for example, calculating the evaluation value for each block in the image capturing only the background without the object to be detected, and selecting a value that is slightly larger than and is about 1.2 times the largest evaluation value in the evaluation values of all the blocks.

The example has been described, in which the threshold value is set in advance. Alternatively, the threshold value may be adaptively calculated depending on the image. The evaluation value becomes smaller as the image of the background is more complicated, and thus the threshold value is supposed to become smaller.

The processing of steps ST4 to ST7 is repeatedly executed until the evaluation value calculator 4 calculates the evaluation values of all the blocks and the area determinator 5 determines, on all the blocks, whether the evaluation value is the object area from the evaluation value (step ST8).

After determining whether the block is the object area on all the blocks, the area determinator 5 determines the area in the image, in which the object to be detected exists from the determination result, and outputs position information about one or more blocks belonging to the identified area. The position information indicates a spatial position of each block.

As is apparent from the above description, according to the Embodiment 1, the optical flow calculator 2 is provided to calculate the optical flow between the images captured at different times by the image capturer 1, and the object detector 3 detects the area in the image, in which the object to be detected exists, by using the optical flow calculated by the optical flow calculator 2. Therefore, there is an effect to accurately detect the area in which the object to be detected exists even from an image captured by the image capturer 1 while moving.

In addition, it is not needed to repeat the calculation processing and the determination processing of the evaluation value while changing the size of the block when the evaluation value calculator 4 of the object detector 3 calculates the evaluation value of the block and the area determinator 5 determines whether the block is the object area from the evaluation value. Therefore, there is an effect to detect the area in which the object to be detected exists with a small operation amount.

Since the determination processing here is threshold value processing for the evaluation value and is different from discrimination processing such as pattern recognition processing with a large calculation amount. Therefore, whether the block is the object area can be determined with a small operation amount.

According to the Embodiment 1, the evaluation value calculator 4 aggregates, in the time direction, the spatial sets of the optical flows of the pixels belonging to the blocks at the same spatial position, and thereby generates a larger set. Therefore, there is an effect to offset the errors of the plurality of optical flows in the frames at different times in different error directions and calculate an evaluation value having a less influence of the errors of the optical flows.

Note that, in the Embodiment 1, with a view to enable calculation of a highly accurate evaluation value, even if an error is included in the optical flow, the evaluation value calculator 4 aggregates, in the time direction, spatial sets of the optical flows for the plurality of pixels belonging to the blocks at the same spatial position, of the plurality of optical flows having different calculation times by the optical flow calculator 2, to generate a larger set. With the calculation, a highly accurate evaluation value can be obtained. To prevent an increase in the operation amount in calculating the evaluation value, P (%) of optical flows may be selected from the set of the optical flows in the blocks aggregated in the time direction, as the optical flows used for calculation of the evaluation value.

The value of P (%) may be determined depending on, for example, the performance of the processor 22 or the size of the RAM 23, and can be set to an arbitrary value.

Embodiment 2

In the above-described Embodiment 1, the processing for determining whether the block that is the divided area is the object area has been described. Alternatively, a search window including at least one block may be set and whether an object exists in the search window may be determined.

Figure 7:
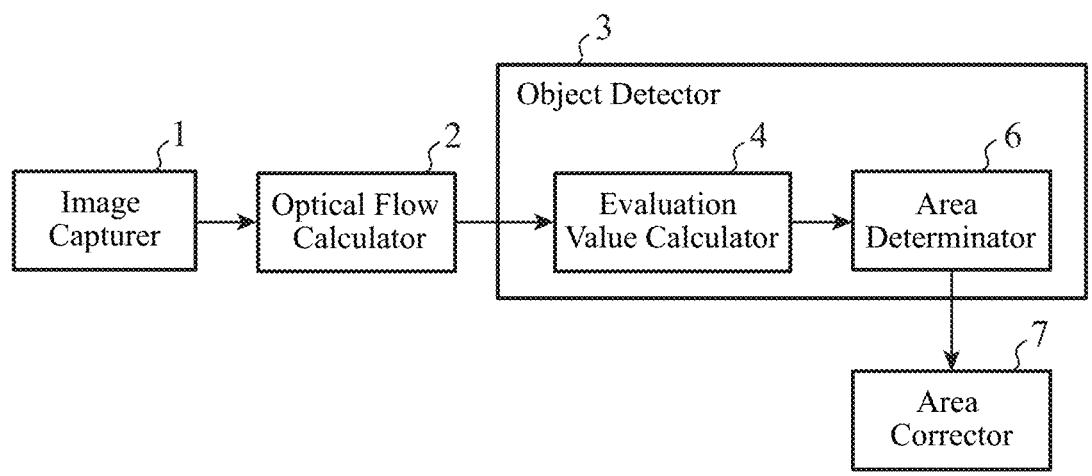
FIG. 7 is a structural diagram illustrating an object detection device according to Embodiment 2 of the present invention.
Figure 8:
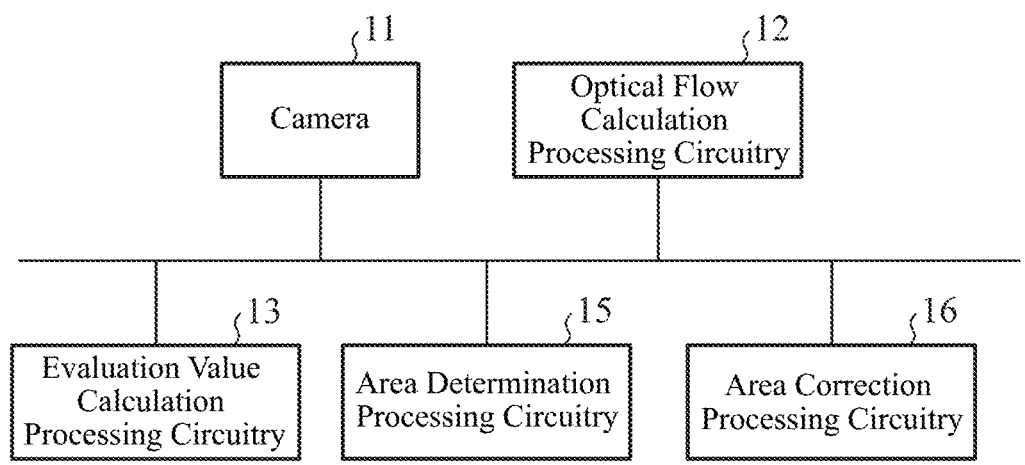
FIG. 8 is a hardware structural diagram illustrating the object detection device according to the Embodiment 2 of the present invention.

FIG. 7 is a structural diagram illustrating an object detection device according to Embodiment 2 of the present invention, and FIG. 8 is a hardware structural diagram illustrating an object detection device according to the Embodiment 2 of the present invention.

In FIGS. 7 and 8, the same reference numeral as that in FIGS. 1 and 2 represents the same or corresponding part, and thus description thereof is omitted.

An area determinator 6 is realized by area determination processing circuitry 15, which is constituted by semiconductor integrated circuitry on which a CPU is mounted or by a single-chip microcomputer, and performs processing for setting a search window which has a size corresponding to a plurality of blocks.

The area determinator 6 determines an area in an image, in which the object to be detected exists, by reading out an evaluation value of a block included in the search window from evaluation values of blocks calculated by an evaluation value calculator 4, calculating a score indicating a measure of a possibility that an object exists in the search window from the read-out evaluation value, and comparing the score with a threshold value.

An area corrector 7 is realized by area correction processing circuitry 16, which is constituted by semiconductor integrated circuitry on which a CPU is mounted or by a single-chip microcomputer, and performs processing for correcting the area determined by the area determinator 6.

Specifically, the area corrector 7 calculates an image characteristic amount in the area determined by the area determinator 6, an image characteristic amount in an enlarged area of the determined area, and an image characteristic amount in a reduced area of the determined area. Subsequently, the area corrector 7 compares the calculated image characteristic amounts, and selects, as a corrected area for the determined area, any one among the determined area, the enlarged area, and the reduced area based on the comparison result of the image characteristic amounts.

In FIG. 7, an image capturer 1, an optical flow calculator 2, an object detector 3, and the area corrector 7, each being a structural element of an object detection device, are assumed to be realized by dedicated hardware. Alternatively, the optical flow calculator 2, the object detector 3, and the area corrector 7 may be realized by a computer.

When the optical flow calculator 2, the object detector 3, and the area corrector 7 are realized by a computer such as illustrated in FIG. 3, a program of processing contents of the optical flow calculator 2, the object detector 3, and the area corrector 7 may be stored in a program memory 21 of the computer. In this case, a processor 22 of the computer may execute the program stored in the program memory 21.

Figure 9:
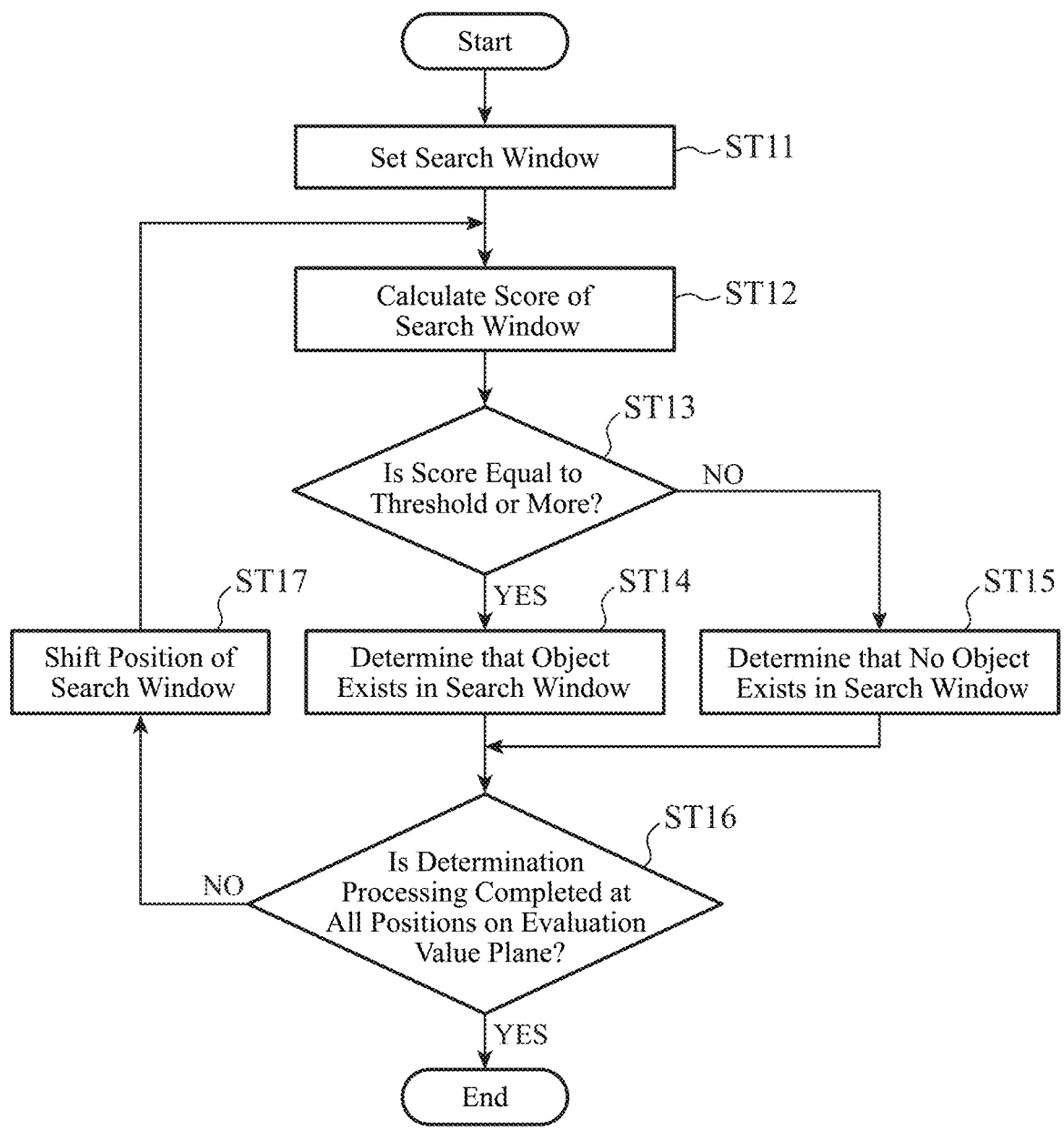
FIG. 9 is a flowchart illustrating processing contents of an area determinator 6 in an object detector 3.
Figure 10:
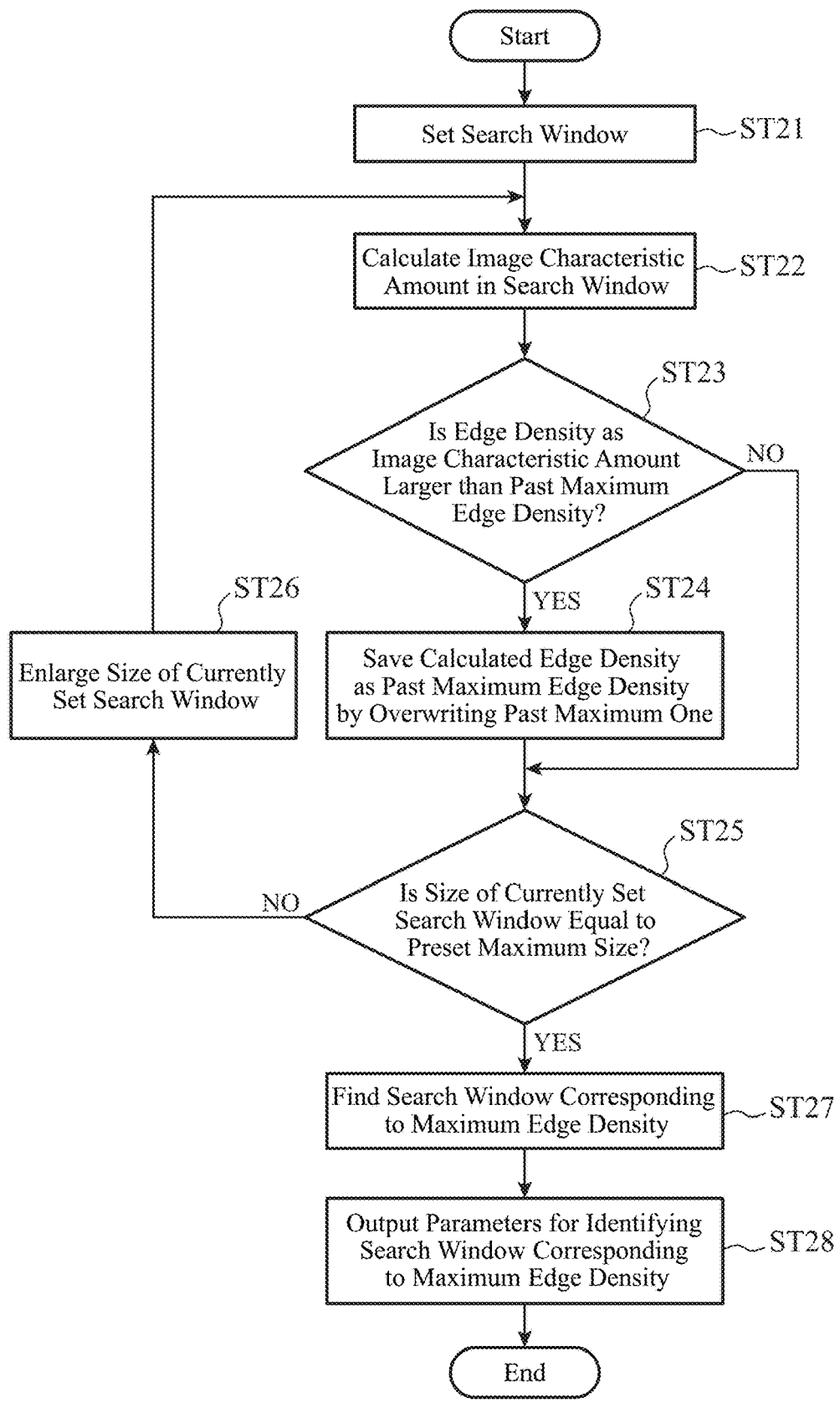
FIG. 10 is a flowchart illustrating processing contents of an area corrector 7.

FIG. 9 is a flowchart illustrating processing contents of the area determinator 6 in the object detector 3. FIG. 10 is a flowchart illustrating processing contents of the area corrector 7.

Next, an operation will be described.

Note that units except for the area determinator 6 and the area corrector 7 are similar to those in the Embodiment 1. Therefore, here, processing contents of the area determinator 6 and the area corrector 7 will be described.

After the evaluation value calculator 4 aggregates, in a time direction, spatial sets of optical flows of pixels belonging to blocks located at the same spatial position and thereby generates a larger set, the area determinator 6 sets a search window which has a size corresponding to a plurality of blocks (step ST11 in FIG. 9).

Figure 11:
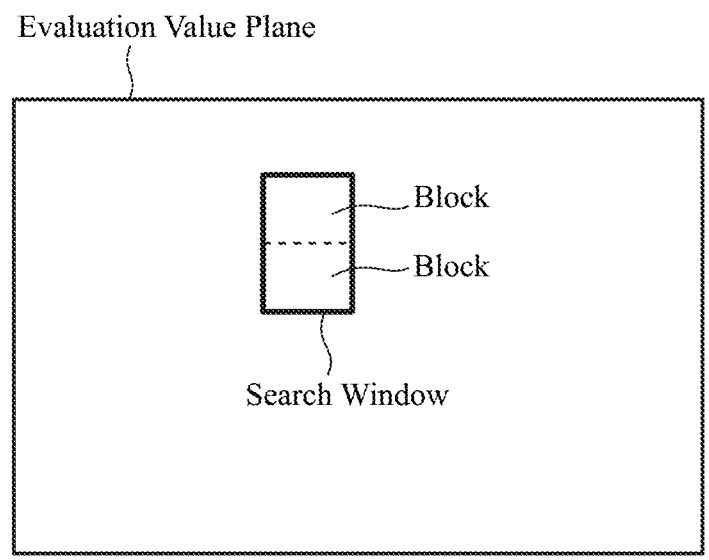
FIG. 11 is an explanatory diagram illustrating a setting example of a search window performed by the area determinator 6.

FIG. 11 is an explanatory diagram illustrating a setting example of a search window performed by the area determinator 6.

In FIG. 11, a plane, on which evaluation values of individual blocks are distributed, is referred to as an evaluation value plane on the assumption that the evaluation values of the blocks calculated by the evaluation value calculator 4 are distributed on the plane in a manner that the evaluation values correspond to frames of an image. The search window is set on the evaluation value plane. In the example of FIG. 11, a search window is placed, which has a size corresponding to two blocks.

In a case where the search window has a rectangular shape as illustrated in FIG. 11, longitudinal/lateral sizes of the rectangle and coordinates indicating a position of an upper left corner of the rectangle are used as parameters for specifying the search window.

The shape of the search window is not limited to the rectangular shape, and may be any shape.

After setting the search window, the area determinator 6 reads out an evaluation value of a block included in the search window from among the evaluation values of the blocks calculated by the evaluation value calculator 4, and calculates a score indicating a measure of a possibility that an object exists in the search window from the read evaluation value (step ST12 in FIG. 9).

The score calculated by the area determinator 6 may be a total of the evaluation values of the blocks included in the search window, or the like.

Note that, when the total of the evaluation values of the blocks included in the search window is calculated as the score of the search window, the score becomes larger as the size of the search window is larger. In order to suppress the increase in the score in proportion to the size of the search window, an average value of the evaluation values distributed on the evaluation value plane is calculated as an offset, the offset is subtracted from the evaluation values of the blocks included in the search window, and a total of the evaluation values of the blocks after subtraction of the offset may be calculated.

When a search window just fits with an object to be detected, the score of the search window becomes a large value. On the other hand, when a search window does not include an object to be detected, or when the size of the object to be detected is smaller than that of the search window even if the search window includes the object, the score of the search window becomes a small value.

Figure 12:
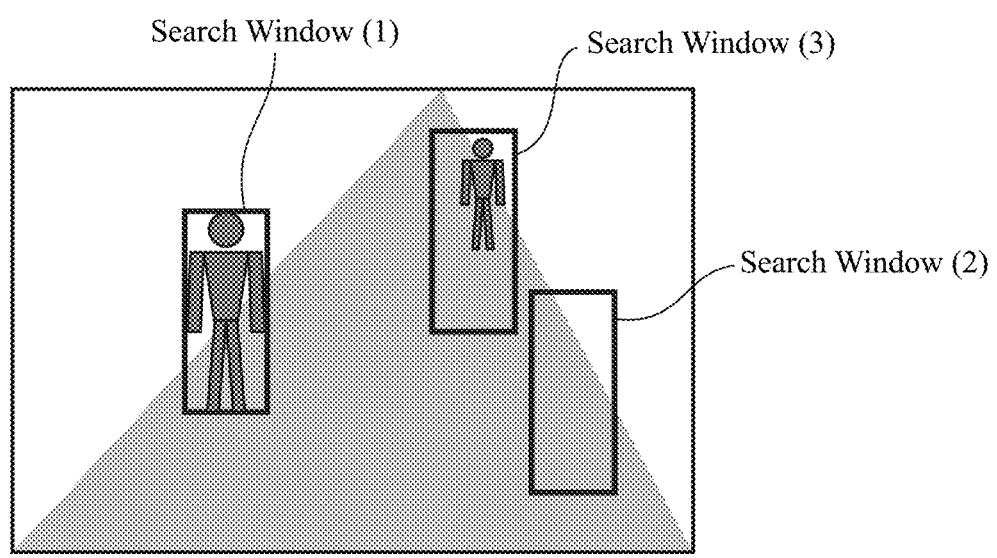
FIG. 12 is an explanatory diagram illustrating relation between search windows and objects to be detected.

FIG. 12 is an explanatory diagram illustrating relation between search windows and objects to be detected.

In FIG. 12, a search window (1) just fits with the object to be detected, and a search window (2) does not include an object to be detected.

In addition, a search window (3) indicates that an object to be detected is included but the size of the object is smaller than that of the search window.

After calculating the score of the search window, the area determinator 6 compares the score with a preset threshold value. When the score is equal to or more than the threshold value (YES at step ST13 in FIG. 9), the area determinator 6 determines that the object exists in the search window (step ST14), and stores, in the RAM 23, the longitudinal/lateral sizes and the positional coordinates of the rectangle as the parameters for specifying the search window.

When the score is less than the threshold value (step ST13: NO), the area determinator 6 determines that no object exists in the search window (step ST15).

The threshold value may be set by, for example, calculating the scores of the search windows of an image capturing only the background without the object to be detected, and selecting a value that is slightly larger than and is about 1.2 times the largest score in the scores of all the search windows.

The example has been described, in which the threshold value is set in advance. Alternatively, for example, the threshold value may be adaptively calculated depending on the image. Since the score becomes smaller as the image of the background is more complicated, the threshold value is supposed to become smaller.

Figure 13:
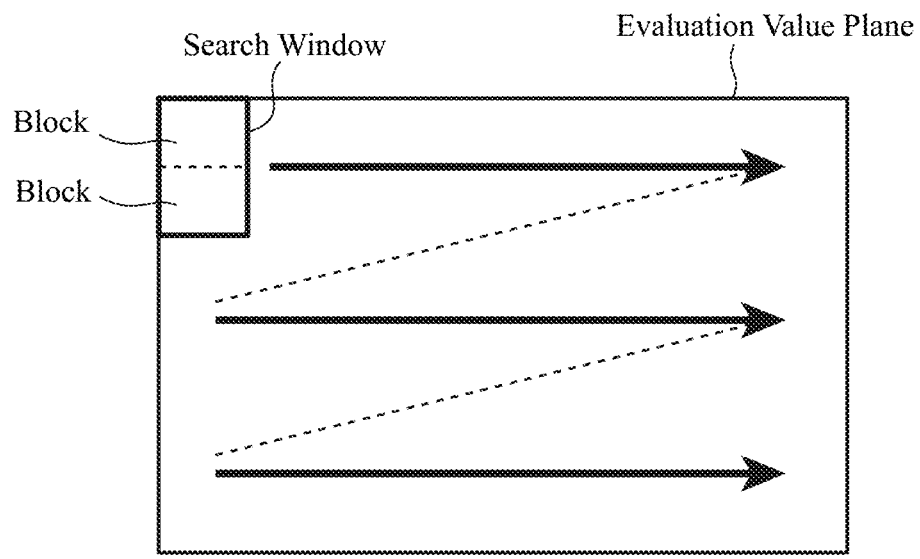
FIG. 13 is an explanatory diagram illustrating processing of the area determinator 6 for determining whether an object exists in a search window while shifting a position of the search window.

FIG. 13 is an explanatory diagram illustrating processing of the area determinator 6 for determining whether an object exists in a search window while shifting the position of the search window.

As illustrated in FIG. 13, until the determination processing is completed at all positions on the evaluation value plane, the area determinator 6 repeatedly executes the processing of steps ST12 to ST15 while shifting the position of the search window on the evaluation value plane (steps ST16 and ST17). The shift of the position of the search window may be performed pixel by pixel, for example.

When the determination processing is completed at all positions on the evaluation value plane, the area determinator 6 determines the area in the image, in which the object to be detected exists, from the determination result, that is, determines the position of the search window at which the object to be detected exists. The area determinator 6 outputs the longitudinal/lateral sizes and the positional coordinates of the rectangle as parameters for specifying the search window.

The example has been described, in which the determination processing is performed at all positions on the evaluation value plane while shifting the position of the search window having a fixed size. Alternatively, a plurality of search windows having different sizes may be prepared, and the determination processing may be performed at all positions on the evaluation value plane while shifting the positions of the plurality of search windows.

In this case, among the plurality of search windows having different sizes, a search window having the highest evaluation value can be considered to have the size substantially the same as that of the object to be detected. Therefore, by identifying the search window having the highest evaluation value, the area in the image in which the object to be detected exists can be determine even if the size of the object to be detected is unknown. That is, the size of the object to be detected can be determined.

Note that, when the search windows having different sizes are used, the operation amount of the determination processing may be increased and the time required for the processing may be increased. Therefore, the number of search windows to be prepared is appropriately decided depending on the performance of the area determination processing circuitry 15 that realizes the area determinator 6 or the processor 22 in the computer that configures the area determinator 6.

The position of the object to be detected can be grasped by reference to the positional coordinates output by the area determinator 6. In the case of using the search windows having different sizes, the size of the object to be detected can be grasped by reference to the longitudinal/lateral sizes of the rectangle output by the area determinator 6.

However, even if errors in optical flows at different calculation times are offset by generating a set of the optical flows in the time direction, an error of an optical flow may remain.

In the case where the error of the optical flow remains, even if a search window having the highest evaluation value is identified from among the search windows having different sizes, the degree of coincidence may be lowered between the size and position of the search window having the highest evaluation value and the size and position of the object to be detected.

In such case, it may be impossible to accurately grasp the size and position of the object to be detected even by reference to the longitudinal/lateral sizes and the positional coordinates of the rectangle output by the area determinator 6.

Figure 14:
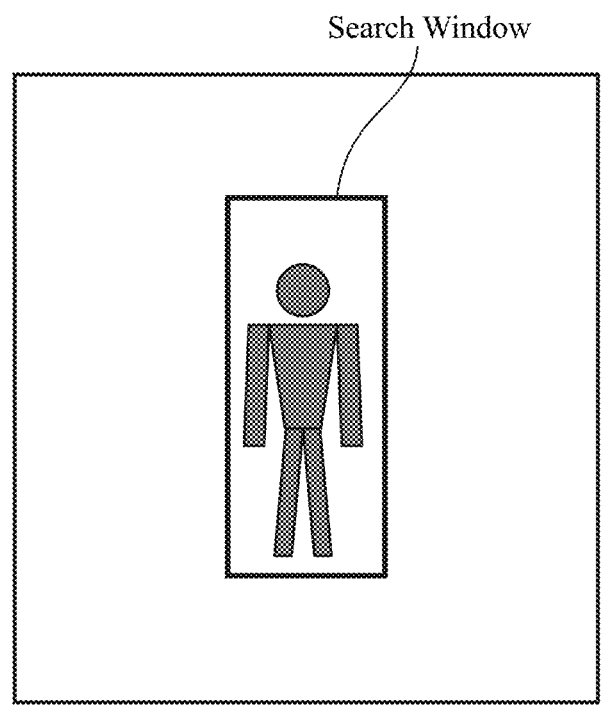
FIG. 14 is an explanatory diagram illustrating an example of a case where a size and a position of an object to be detected cannot be accurately grasped even by reference to longitudinal/lateral sizes and positional coordinates of a rectangle output by the area determinator 6.

FIG. 14 is an explanatory diagram illustrating an example of a case where a size and a position of an object to be detected cannot be accurately grasped even by reference to longitudinal/lateral sizes and positional coordinates of a rectangle output by the area determinator 6.

In FIG. 14, an example is shown, in which the size of the object to be detected is smaller than the size of the search window having the highest evaluation value.

In the Embodiment 2, the area corrector 7 is provided for correcting the area determined by the area determinator 6.

Hereinafter, processing contents of the area corrector 7 will be specifically described with reference to FIG. 10.

The area corrector 7 sets a search window to the evaluation value plane by reference to the longitudinal/lateral sizes and the positional coordinates of the rectangle output by the area determinator 6 (step ST21 in FIG. 10).

Figure 15:
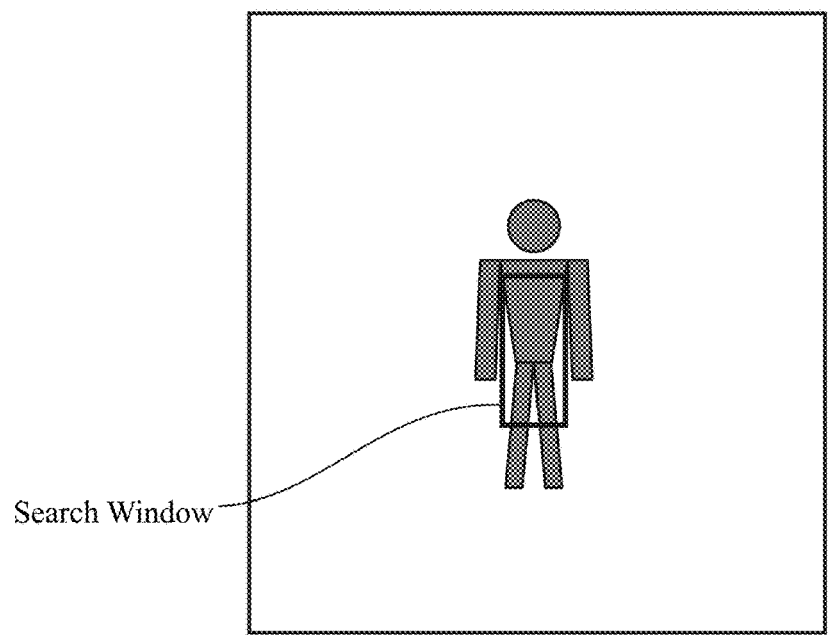
FIG. 15 is an explanatory diagram illustrating a setting example of a search window by the area corrector 7.

FIG. 15 is an explanatory diagram illustrating a setting example of a search window by the area corrector 7.

The shape of the search window is not limited to a rectangle. It is desirable to set a window having a size sufficiently smaller than a search window that is determined by the area determinator 6 as including the object to be detected. For example, a search window, which has a size of about 0.5 times the size of the search window including the object to be detected, may be set.

Note in this case that, it is required to arrange a search window to be set such that the position of central coordinates thereof coincides with that of a search window determined as including the object to be detected.

After setting the search window on the evaluation value plane, the area corrector 7 calculates an image characteristic amount within the search window (step ST22 in FIG. 10).

The image characteristic amount may be a characteristic amount calculated from a pixel value of an image frame to be processed, and characteristic amounts based on a color, an edge, a gradient, and the like of the image.

The characteristic amount based on the color may be a color histogram representing appearance frequency of each color in the image in the search window.

The characteristic amount based on the edge may be edge density representing density of an edge existing on a periphery of the search window.

The characteristic amount based on the gradient may be a histogram of oriented gradients (HOG) representing appearance frequency in a gradient direction of a pixel value in the image in the search window, or the like.

In the Embodiment 2, it is assumed that the image characteristic amount is the edge density.

In a case of calculating the edge density as the image characteristic amount in the search window, in order to obtain an edge image, the area corrector 7 applies, for example, a canny edge detection ("Canny") filter or a differential filter to partial images on which the search window is set.

The edge image refers to an image in which a pixel positioned at the edge of the image (hereinafter referred to as "an edge pixel") has a value of "1" while a pixel, which is not positioned at the edge of the image (hereinafter referred to as "a non-edge pixel), has a value of "0", for example.

After obtaining the edge image, the area corrector 7 calculates the edge density by counting a total number of edge pixels on the periphery of the search window and dividing the total number of the edge pixels by a peripheral length of the search window.

Figure 16:
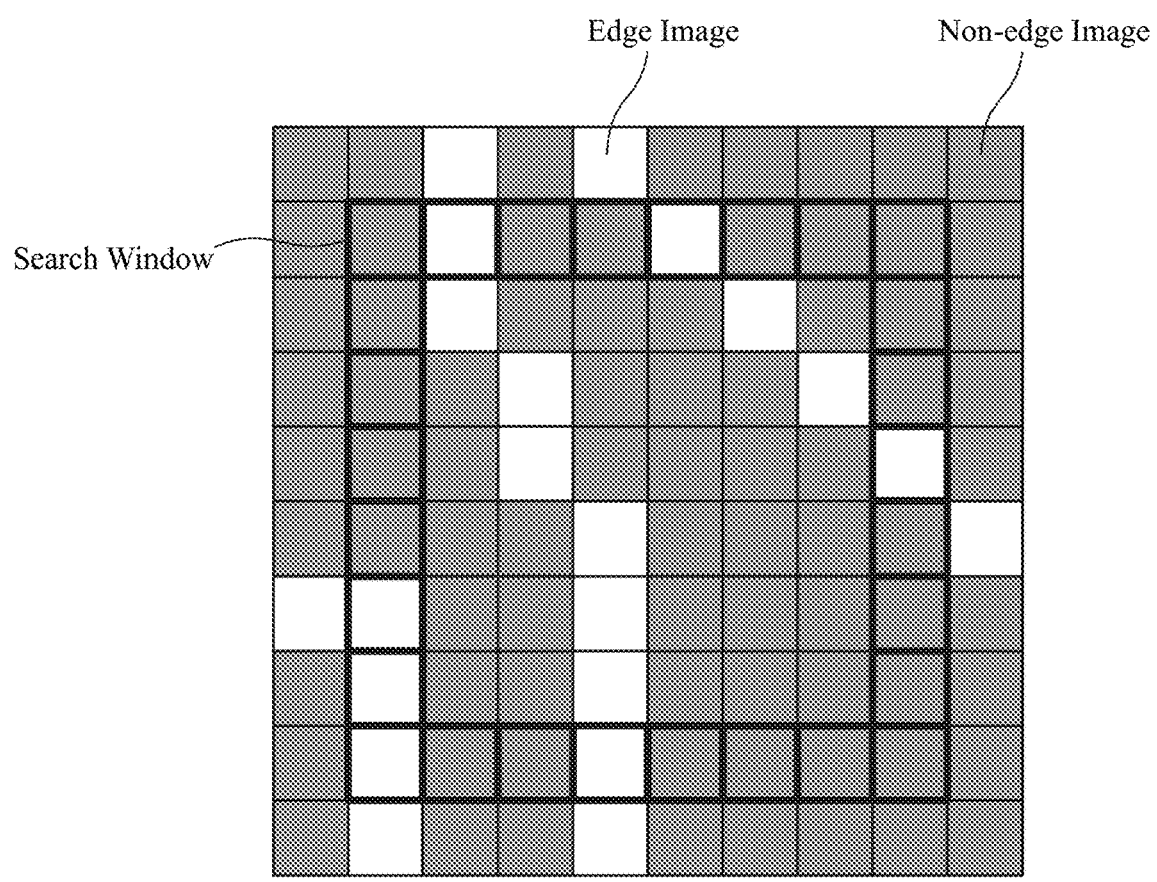
FIG. 16 is an explanatory diagram illustrating an example of an edge image.

FIG. 16 is an explanatory diagram illustrating an example of an edge image.

In FIG. 16, an example of an edge image including 10×10 pixels is shown, and pixels in gray are the non-edge pixels and pixels in white are the edge pixels.

In the illustrated edge image, when the search window set by the area corrector 7 consists of 8×8 pixels, the pixels around the search window are 28 pixels surrounded by the thick solid lines, as illustrated in FIG. 16.

Thus, in the example of FIG. 16, the total number of the edge pixels is 7 and the peripheral length of the window is 28. Accordingly, the edge density is obtained as 7÷28=0.25.

After calculating the edge density as the image characteristic amount within the search window, the area corrector 7 compares the edge density with past maximum edge density stored in the RAM 23. When the calculated edge density is larger than the past maximum edge density (YES at step ST23 in FIG. 10), the area corrector 7 overwrites the RAM 23 with the calculated edge density as the past maximum edge density (step ST24). In addition, the longitudinal/lateral sizes and the positional coordinates of the rectangle are stored in the RAM 23 as the parameters for specifying the search window.

The past maximum edge density has a meaning of the largest edge density among the edge density calculated in the past by the area corrector 7. Note that, at the time when the edge density is initially calculated by the area corrector 7, an initial value of 0 is stored in the RAM 23 as the past maximum edge density.

When the size of the currently set search window is not a preset maximum size (step ST25: NO), the area corrector 7 enlarges the size of the currently set search window (step ST26). For example, the size is enlarged by 1.1 times the size of the currently set search window.

Figure 17:
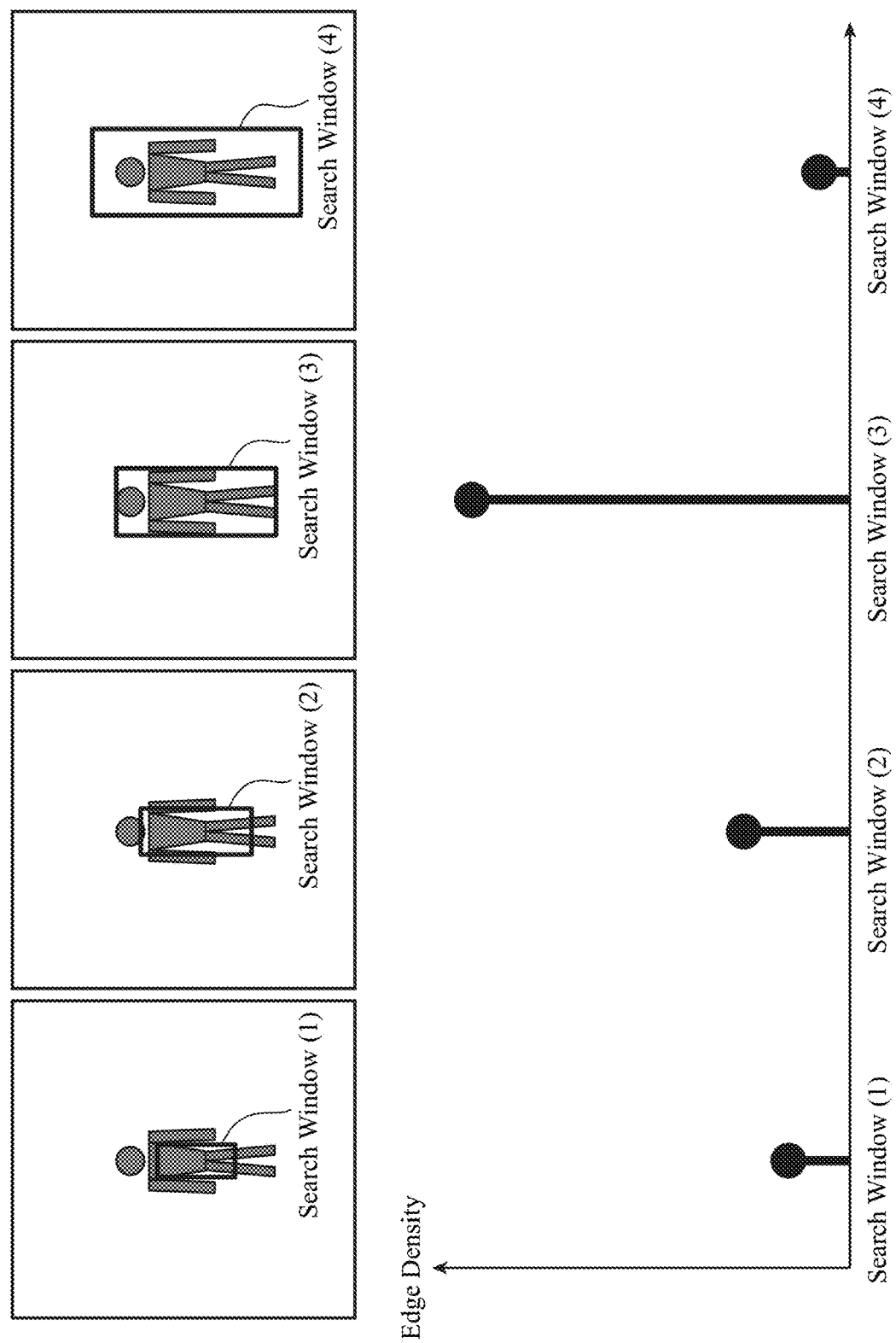
FIG. 17 is an explanatory diagram illustrating relation between search windows and edge density.

FIG. 17 is an explanatory diagram illustrating relation between search windows and edge density.

In the example of FIG. 17, it is assumed that the preset maximum size is the size of the search window (4). Therefore, when the size of the currently set search window is smaller than the size of the search window (4), the size of the currently set search window is enlarged.

In FIG. 17, the search window (1) is an initially set window, and the search window (2) is an enlarged window based on the search window (1).

Further, the search window (3) is an enlarged window based on the search window (2), and the search window (4) is an enlarged window based on the search window (3).

For simplifying the description, FIG. 17 illustrates the example in which the number of the search windows set by the area corrector 7 is four. However, in practice, in order to enhance correction accuracy of the area corrector 7, it may be assumed that four or more search windows are set.

In such condition, any number of search windows, which is set by the area corrector 7, can be available only when a window having the same size as the search window determined to include the object to be detected and also windows having smaller and larger sizes than the determined search window are counted among the number of search windows. However, when the number of search windows set by the area corrector 7 is increased, the operation amount of the area corrector 7 increases and the processing takes time. Therefore, it is desirable that the number of search windows set by the area corrector 7 is appropriately decided depending on the performance of the area correction processing circuitry 16 realizing the area corrector 7 or the performance of the processor 22 in the computer realizing the area corrector 7.

After enlarging the size of the currently set search window, the area corrector 7 calculates the image characteristic amount in the search window (step ST22 in FIG. 10). In the Embodiment 2, the edge density is calculated as the image characteristic amount in the search window, similarly to the above description.

After calculating the edge density as the image characteristic amount in the search window, the area corrector 7 compares the edge density with the past maximum edge density stored in the RAM 23. When the calculated edge density is larger than the past maximum edge density (step ST23: YES), the area corrector 7 overwrites the RAM 23 with the calculated edge density as the past maximum edge density. In addition, the area corrector 7 stores in the RAM 23 the longitudinal/lateral sizes and the positional coordinates of the rectangle, each being the parameters for specifying the search window (step ST24).

The area corrector 7 calculates the edge density of each of the search windows (1) to (4) as the image characteristic amount by repeatedly executing steps ST22 to ST26 until the size of the currently set search window becomes the preset maximum size. After that, the area corrector 7 identifies the maximum edge density among the edge densities of the search windows (1) to (4), that is, finds a search window corresponding to the maximum edge density stored in the RAM 23 (step ST27).

In the example of FIG. 17, since the search window (3) has the maximum edge density among the edge densities of the search windows (1) to (4), the search window (3) is identified as corresponding to the maximum edge density.

The edge density becomes significantly large when a boundary of the search window and a boundary of an object area accurately coincide with each other. The boundary of the search window (3) has the largest edge density because it fully coincides with the boundary of the object area, compared with the search windows (1), (2), and (4).

After identifying the search window corresponding to the maximum edge density stored in the RAM 23, the area corrector 7 outputs the longitudinal/lateral sizes and the positional coordinates of the rectangle, each being the parameters for specifying the search window corresponding to the maximum edge density, as information indicating an corrected area for the area determined by the area determinator 6 (step ST28).

In addition to the above, the area corrector 7 may correct the area determined by the area determinator 6 on the basis of the color, the optical flow, or the like, each being included in the determined area. In this case, area correction is performed by searching an image for a part having similar color and optical flow to those in the area determined by the area determinator 6.

As is apparent from the above description, according to the Embodiment 2, the image characteristic amount in the area determined by the area determinator 6, the image characteristic amount in an enlarged area for the determined area, and the image characteristic amount in a reduced area for the determined area are calculated, the calculated image characteristic amounts are compared, and any one among the determined area, the enlarged area, and the reduced area is selected as the corrected area for the determined area based on the comparison result of the image characteristic amounts. Therefore, there is an effect to accurately detect the area in which the object to be detected exists, even in a case where errors of the optical flows remain only by generating the set of the optical flows in the time direction.

In the Embodiment 2, the example has been described, in which a window sufficiently smaller than the search window determined as including the object to be detected is set as a search window, and the size of the set search window is gradually enlarged. Alternatively, it is possible to adopt a manner that a window sufficiently larger than the search window determined as including the object to be detected is set as a search window, and the size of the set search window is gradually reduced.

Embodiment 3

In the Embodiments 1 and 2 described above, the examples have been described, in which the area in the image is determined as including the object is detected by using the optical flow calculated by the optical flow calculator 2. Alternatively, the area in an image including an object may be detected by predicting an optical flow which depends on motion of a camera 11 and a spatial shape captured by the camera 11 and using the predicted optical flow in addition to the optical flow calculated by the optical flow calculator 2.

Figure 18:
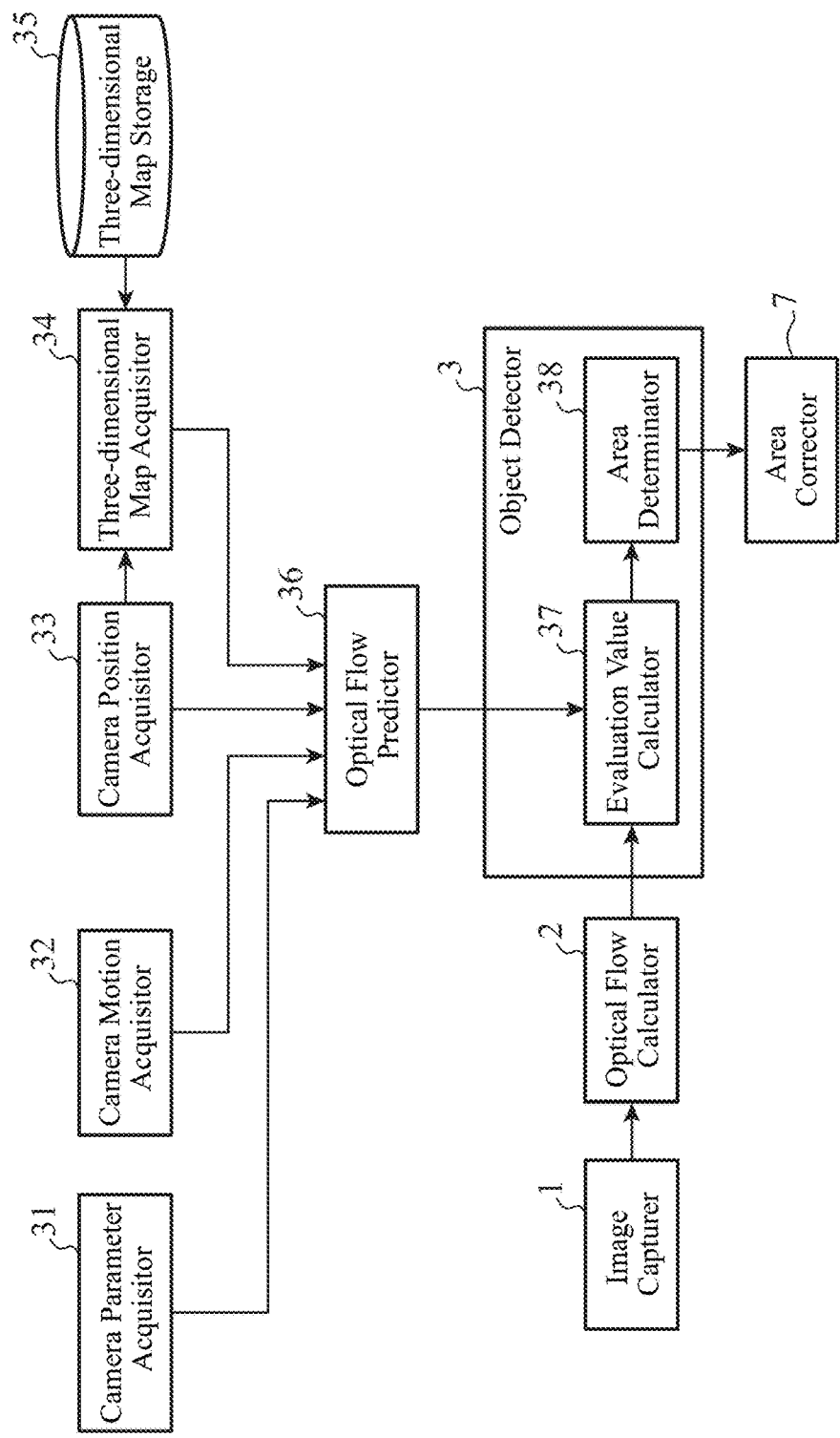
FIG. 18 is a structural diagram illustrating an object detection device according to Embodiment 3 of the present invention.
Figure 19:
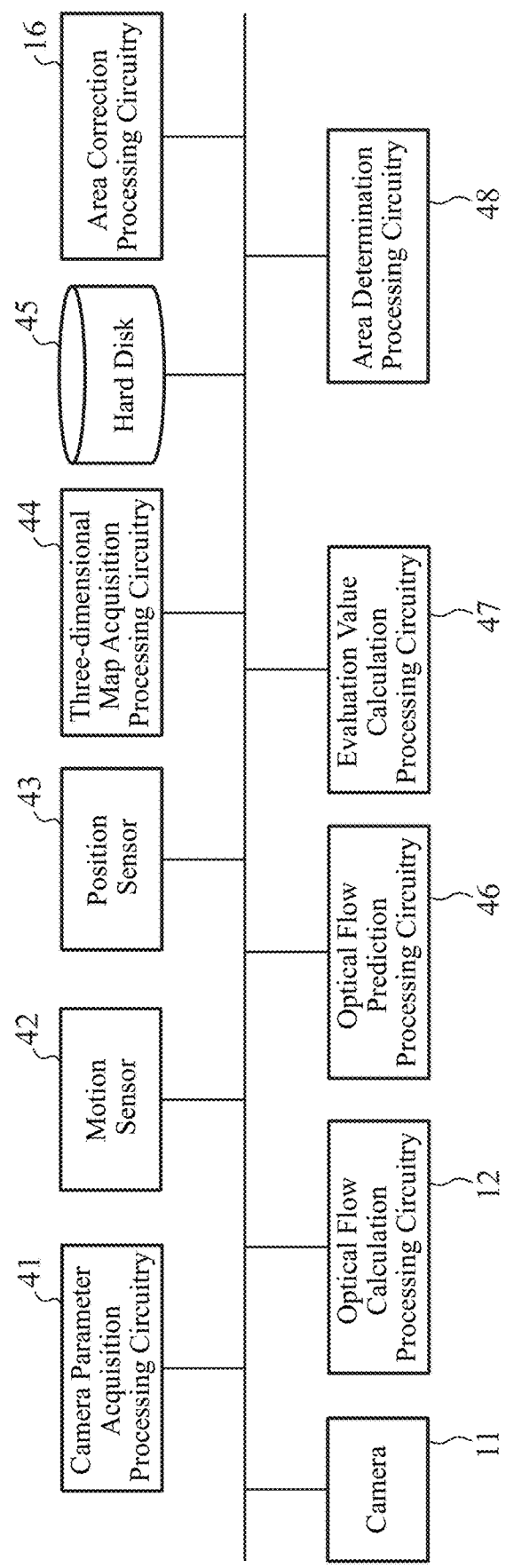
FIG. 19 is a hardware structural diagram illustrating the object detection device according to the Embodiment 3 of the present invention.

FIG. 18 is a structural diagram illustrating an object detection device according to Embodiment 3 of the present invention. FIG. 19 is a hardware structural diagram illustrating the object detection device according to the Embodiment 3 of the present invention.

In FIGS. 18 and 19, the same reference numeral as that in FIGS. 7 and 8 represents the same or corresponding part, and thus description thereof is omitted.

A camera parameter acquisitor 31 is realized by camera parameter acquisition processing circuitry 41 constituted by semiconductor integrated circuitry on which a CPU is mounted or by a single-chip microcomputer. The camera parameter acquisitor 31 acquires camera parameters, such as a focal length of the camera 11 and a size of an image sensor realizing an image capturer 1.

Note that the camera parameter acquisitor 31 may directly read out the camera parameters from the camera 11 or a hard disk 45, for example.

A camera motion acquisitor 32 is realized by motion sensor 42, and acquires motion parameters, such as an inclination and a moving speed of the camera 11. The motion sensor 42 may be a gyro sensor, an acceleration sensor, or the like.

A camera position acquisitor 33 is realized by a position sensor 43, and acquires positional coordinates of the camera 11 in space. The position sensor 43 may be a global positioning system (GPS), a magnetic sensor, an ultrasonic sensor, or the like.

A three-dimensional map acquisitor 34 is realized by three-dimensional map acquisition processing circuitry 44 constituted by semiconductor integrated circuitry on which a CPU is mounted or by a single-chip microcomputer. The three-dimensional map acquisitor 34 reads out from a three-dimensional map storage 35 a spatial three-dimensional map where the camera 11 exists by reference to the positional coordinates acquired by the camera position acquisitor 33.

It is assumed that the three-dimensional map is measured using a laser scanner or a stereo camera and is stored in advance in the three-dimensional map storage 35. Note that, in a case of an indoor facility, the three-dimensional map may be generated based on design drawing of the indoor facility and be stored in the three-dimensional map storage 35.

The three-dimensional map storage 35 is realized by the hard disk 45 and stores the three-dimensional map.

An optical flow predictor 36 is realized by optical flow prediction processing circuitry 46 constituted by semiconductor integrated circuitry on which a CPU is mounted or by a single-chip microcomputer. The optical flow predictor 36 predicts an optical flow, which depends on a three-dimensional shape of a space where the camera 11 exists, by using the motion parameter acquired by the camera motion acquisitor 32, the positional coordinates of the camera 11 in the space acquired by the camera position acquisitor 33, and the three-dimensional map of the space acquired by the three-dimensional map acquisitor 34.

In addition, the optical flow predictor 36 obtains the optical flow, which depends on the motion of the camera 11 and the shape of the space captured by the camera 11, by projecting the optical flow, which depends on the predicted three-dimensional shape, onto a two-dimensional image plane by using the camera parameters acquired by the camera parameter acquisitor 31. The optical flow predictor 36 outputs the obtained optical flow to an evaluation value calculator 37.

An object detector 3 is realized by the evaluation value calculator 37 and an area determinator 38. The object detector 3 detects an area in an image, in which an object to be detected exists, by using the optical flow output by the optical flow calculator 2 and the optical flow output by the optical flow predictor 36.

The evaluation value calculator 37 is realized by evaluation value calculation processing circuitry 47 constituted by semiconductor integrated circuitry on which a CPU is mounted or by a single-chip microcomputer. The evaluation value calculator 37 calculates, for each pixel of an image, an evaluation value indicating a measure of a possibility that the pixel represents part of the object to be detected, by using the optical flow output by the optical flow calculator 2 and the optical flow output by the optical flow predictor 36.

The area determinator 38 is realized by area determination processing circuitry 48 constituted by semiconductor integrated circuitry on which a CPU is mounted or by a single-chip microcomputer. The area determinator 38 determines the area in the image, in which the object to be detected exists, by comparing the evaluation value of each pixel calculated by the evaluation value calculator 37 with a threshold value.

In FIG. 18, it is assumed that each of the image capturer 1, the optical flow calculator 2, the camera parameter acquisitor 31, the camera motion acquisitor 32, the camera position acquisitor 33, the three-dimensional map acquisitor 34, the three-dimensional map storage 35, the optical flow predictor 36, the object detector 3, and the area corrector 7, which are structural elements of the object detection device, is realized by dedicated hardware. Alternatively, the optical flow calculator 2, the optical flow predictor 36, the object detector 3, and the area corrector 7 may be realized by a computer.

When the optical flow calculator 2, the optical flow predictor 36, the object detector 3, and the area corrector 7 are realized by a computer, as illustrated in FIG. 3, a program in which processing contents of the optical flow calculator 2, the optical flow predictor 36, the object detector 3, and the area corrector 7 are described may be stored in a program memory 21 of the computer, and a processor 22 of the computer may execute the program stored in the program memory 21.

Figure 20:
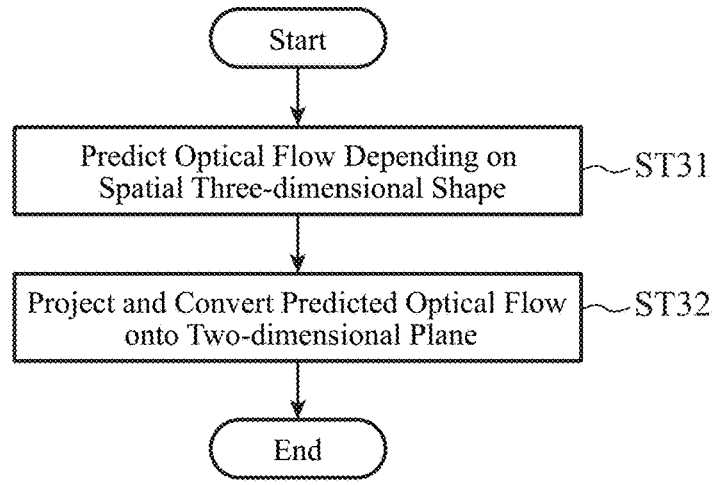
FIG. 20 is a flowchart illustrating processing contents of an optical flow predictor 36.
Figure 21:
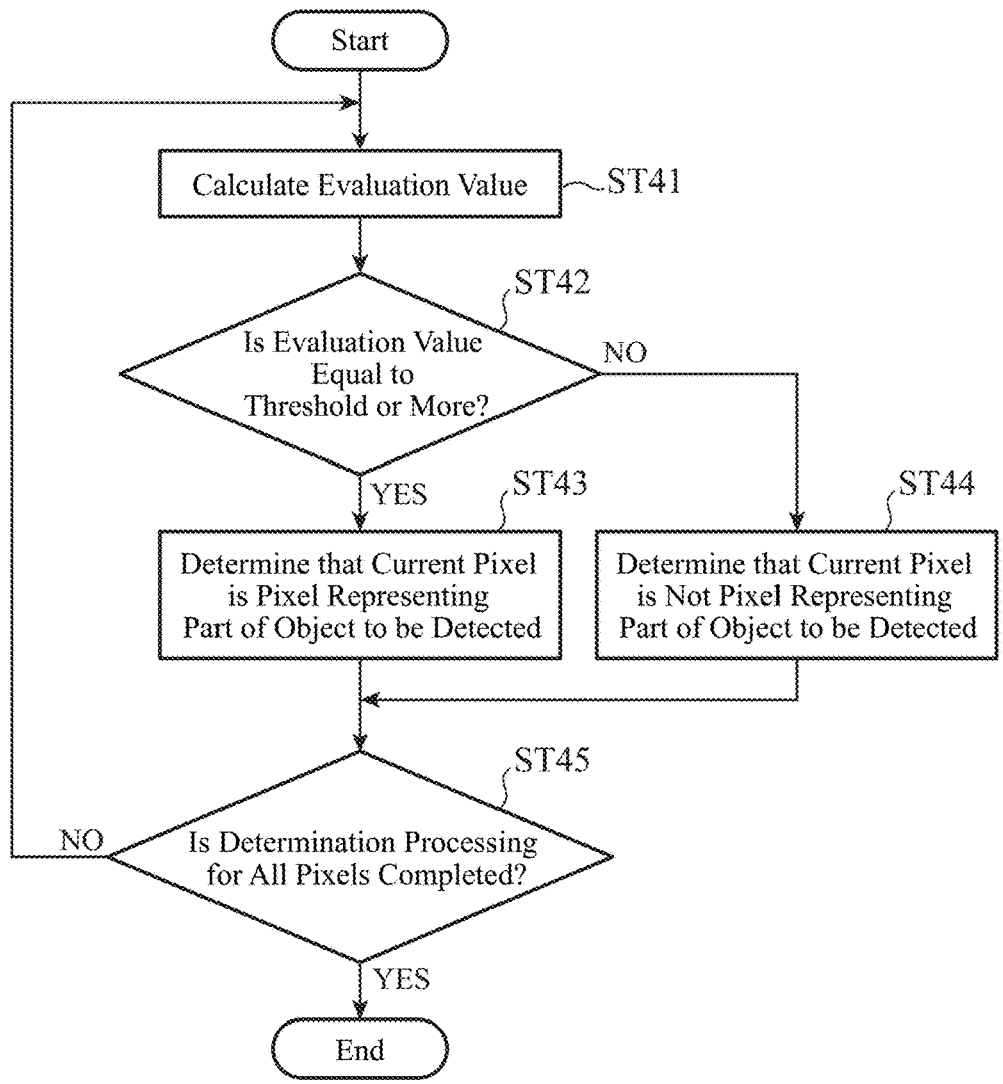
FIG. 21 is a flowchart illustrating processing contents of an evaluation value calculator 37 and an area determinator 38 in an object detector 3.

FIG. 20 is a flowchart illustrating processing contents of the optical flow predictor 36. FIG. 21 is a flowchart illustrating processing contents of the evaluation value calculator 37 and the area determinator 38 in the object detector 3.

Next, an operation will be described.

Similarly to the Embodiment 1, the image capturer 1 realized by the camera 11, which is movable at the time of capture, continuously captures temporally continuous images.

Specifically, assuming that an interval of image sampling is "t", the image capturer 1 captures a frame image every time when the time t passes, and outputs image data of the frame to the optical flow calculator 2.

Similarly to the Embodiment 1, the optical flow calculator 2 stores the image data of the frame every time receiving the image data of the frame from the image capturer 1, and calculates optical flows between arbitrary two frames by using the image data of the arbitrary two frames. For example, optical flows between a latest frame and the previous one are calculated.

The camera parameter acquisitor 31 acquires the camera parameters, such as a focal length of the camera 11 and a size of an image sensor realizing the image capturer 1, and outputs the camera parameters to the optical flow predictor 36.

The camera motion acquisitor 32 acquires the motion parameters, such as an inclination and a moving speed of the camera 11, and outputs the motion parameters to the optical flow predictor 36.

The camera position acquisitor 33 acquires coordinates of the spatial position of the camera 11, and outputs the positional coordinates to the optical flow predictor 36 and the three-dimensional map acquisitor 34.

After receiving the positional coordinates from the camera position acquisitor 33, the three-dimensional map acquisitor 34 reads out from the three-dimensional map storage 35 the three-dimensional map of the space where the camera 11 exists by reference to the positional coordinates. The readout three-dimensional map is output to the optical flow predictor 36.

An optical flow in space where no object to be detected exists depends on the motion of the camera 11 and a three-dimensional shape of a background of the space captured by the camera 11.

On the other hand, an optical flow calculated from an image including the object to be detected depends on the motion of the camera 11, the three-dimensional shape of a background of the space captured by the camera 11, and a shape and motion of the object to be detected in the space.

Further, projection of the three-dimensional space captured by the camera 11 onto the two-dimensional image plane depends on the camera parameters.

Therefore, the optical flow predictor 36 predicts the optical flow which depends on the three-dimensional shape of the space in which the camera 11 exists by using the motion parameter output by the camera motion acquisitor 32, the positional coordinates of the camera 11 in the space output by the camera position acquisitor 33, and the three-dimensional map of the space output by the three-dimensional map acquisitor 34 (step ST31 in FIG. 20).

In the Embodiment 3, it is assumed that the optical flow obtained by the optical flow predictor 36 is predicted in a state where no object to be detected exists in the space captured by the camera 11.

Note that the processing for predicting the optical flow which depends on the three-dimensional shape of the space by using the motion parameter of the camera 11, the positional coordinates of the camera 11 in the space, and the three-dimensional map of the space on which the camera 11 exists can be performed by a known technology, and thus detailed description thereof is omitted.

After predicting the optical flow which depends on the three-dimensional shape of the space where the camera 11 exists, the optical flow predictor 36 obtains the optical flow which depends on the motion of the camera 11 and the spatial shape captured by the camera 11 by projecting the predicted optical flow onto the two-dimensional image plane by using the camera parameters output by the camera parameter acquisitor 31, and outputs the obtained optical flow to the evaluation value calculator 37 of the object detector 3 (step ST32).

The processing for projecting the predicted optical flow onto the two-dimensional image plane can be performed by a known technology, and thus detailed description thereof is omitted.

Figure 22:
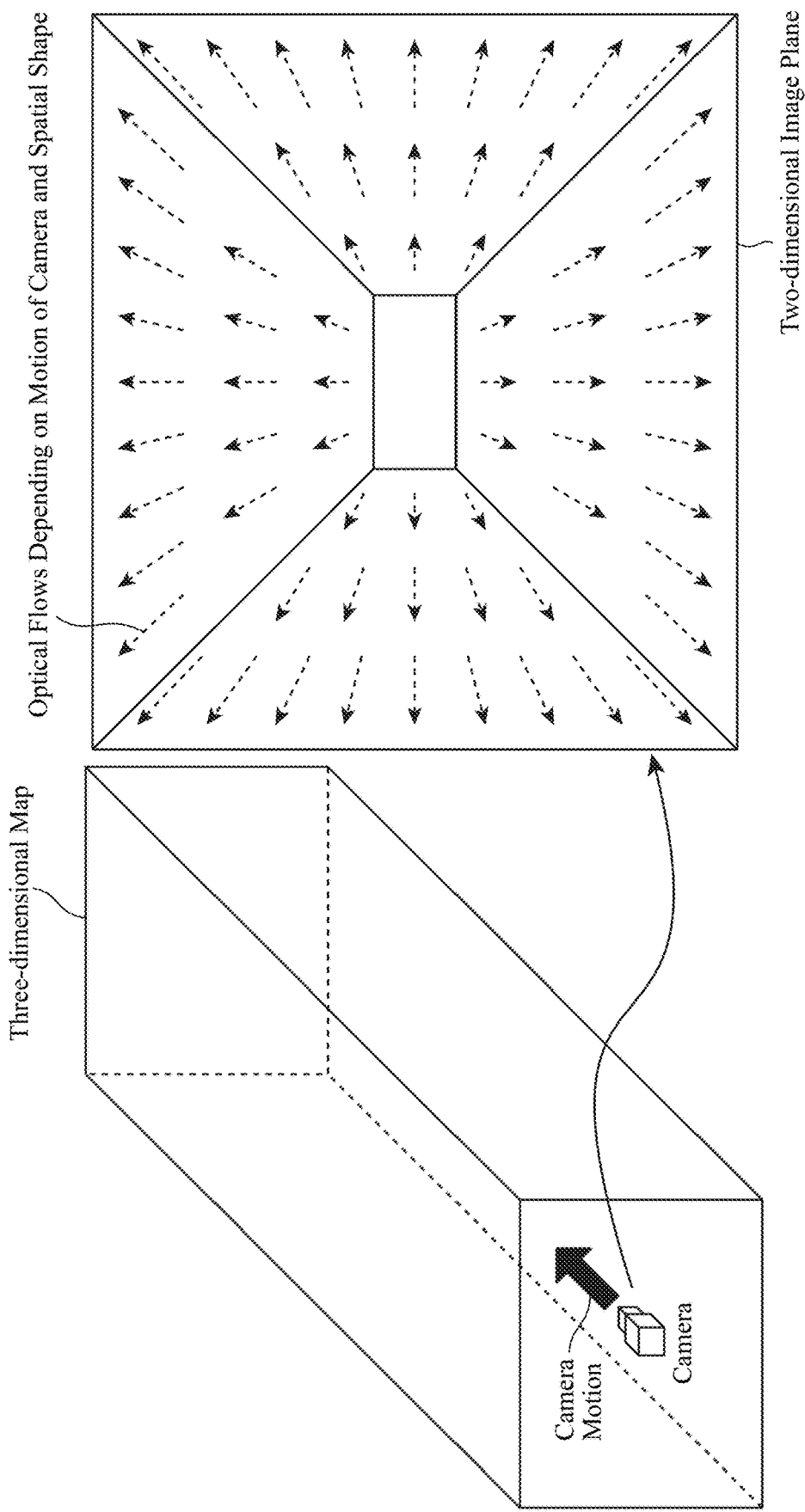
FIG. 22 is an explanatory diagram illustrating an example of optical flows obtained by the optical flow predictor 36, which depends on motion of a camera 11 and a spatial shape captured by the camera 11.

FIG. 22 is an explanatory diagram illustrating an example of optical flows obtained by the optical flow predictor 36, which depends on motion of a camera 11 and a spatial shape captured by the camera 11.

Figure 23:
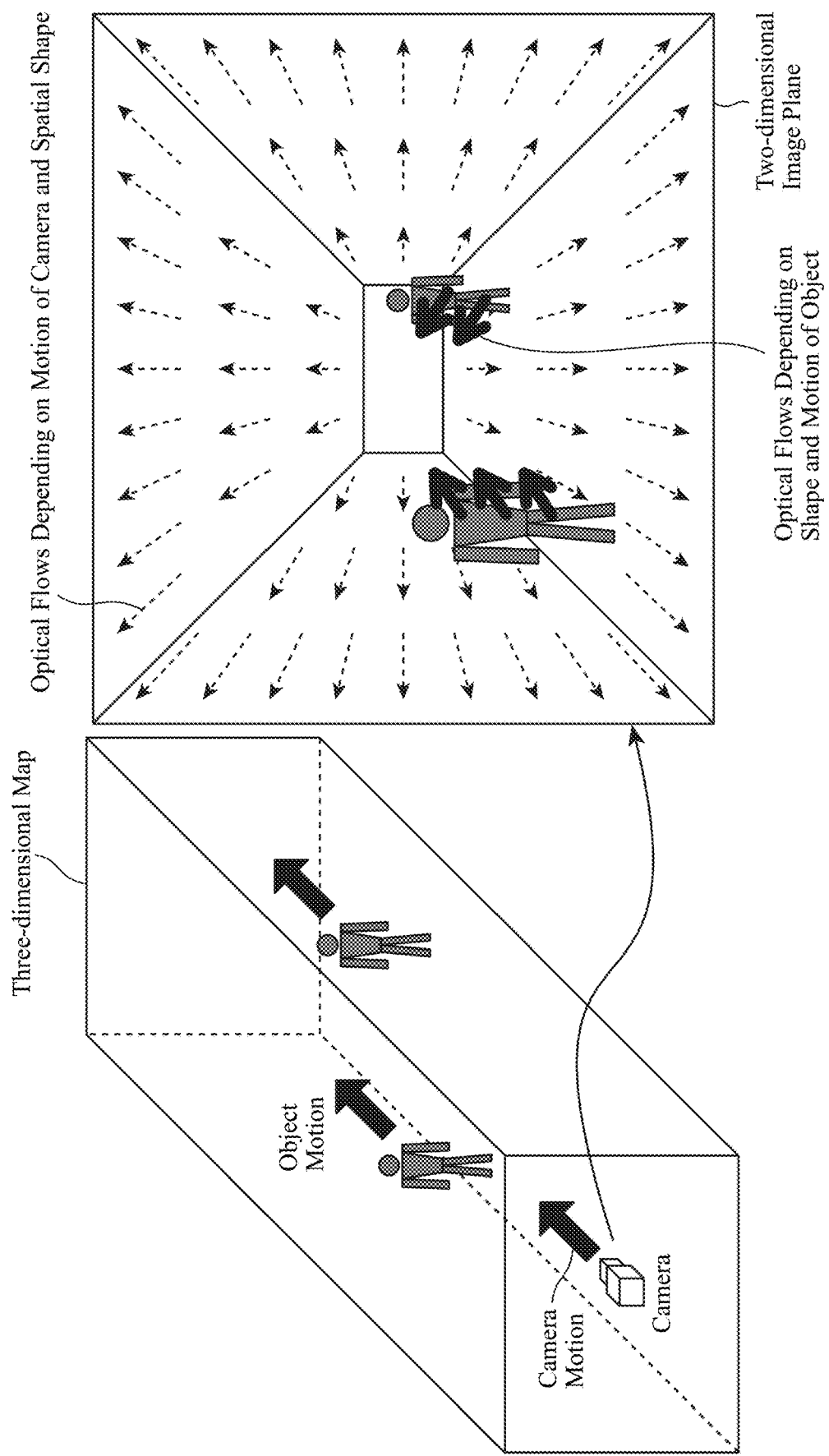
FIG. 23 is an explanatory diagram illustrating an example of optical flows calculated by an optical flow calculator 2.

FIG. 23 is an explanatory diagram illustrating an example of optical flows calculated by the optical flow calculator 2.

In the Embodiment 3, it is assumed that the optical flow calculated by the optical flow calculator 2 is calculated in a state where the object to be detected exists in the space captured by the camera 11. Therefore, the optical flows illustrated in FIG. 23 indicate that the optical flows which depend on the motion of the camera 11 and the spatial shape captured by the camera 11 and the optical flows which depend on the shape and the motion of the object to be detected in the space are synthesized.

The evaluation value calculator 37 of the object detector 3 calculates the evaluation value indicating a measure of a possibility that a pixel constituting the image frame represents part of the object to be detected by comparing, for each pixel of the image frame, the optical flow output by the optical flow calculator 2 and the optical flow output by the optical flow predictor 36 (step ST41 in FIG. 21).

A difference norm between a pair of optical flows expressed by, for example, the following expression (3) may be used for the evaluation value at a coordinate i in the frame.

[Expression 3]

$$\|f_i - g_i\| \tag{3}$$

In the expression (3), it can be assumed that $f_i$ is the optical flow at the coordinate i output by the optical flow calculator 2, and $g_i$ is the optical flow at the coordinate i output by the optical flow predictor 36. The symbol $\|\cdot\|$ represents the norm.

Figure 24:
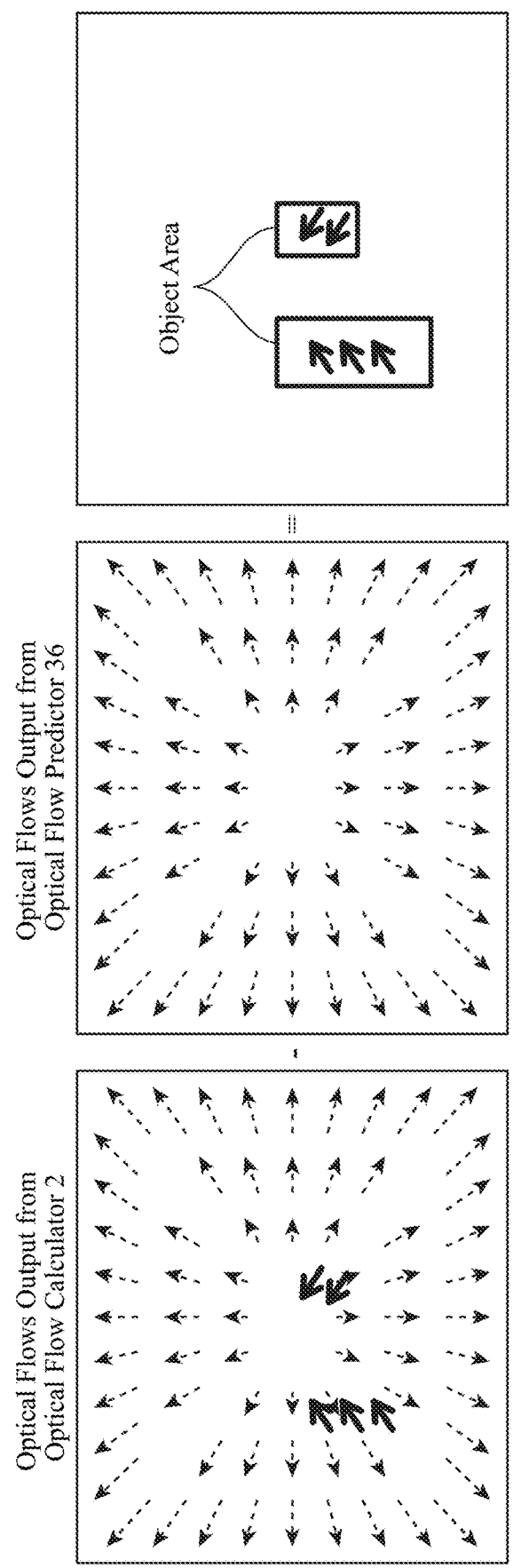
FIG. 24 is an explanatory diagram illustrating a difference between optical flows output by the optical flow calculator 2 and optical flows output by the optical flow predictor 36.

FIG. 24 is an explanatory diagram illustrating a difference between the optical flows output by the optical flow calculator 2 and the optical flows output by the optical flow predictor 36.

In FIG. 24, the object area corresponds to the difference between both of the optical flows.

After the evaluation value calculator 37 calculates the evaluation value of the pixel constituting the image frame, the area determinator 38 of the object detector 3 compares the evaluation value of the pixel with a preset threshold value. When the evaluation value is the threshold value or more (YES at step ST42 in FIG. 21), the area determinator 38 determines that the pixel represents part of the object to be detected (step ST43).

On the other hand, when the evaluation value of the pixel is less than the threshold value (step ST42: NO), the pixel is determined not to represent part of the object to be detected (step ST44).

The threshold value may be set by calculating the evaluation values of pixels in an image capturing only the background without the object to be detected and selecting a value that is slightly larger than and is about 1.2 times the largest evaluation value in the evaluation values of all the pixels.

The example has been described, in which the threshold value is set in advance. Alternatively, for example, the threshold value may be adaptively calculated depending on the image. Since the evaluation value becomes smaller as the image of the background is more complicated, the threshold value is supposed to become smaller.

The processing of steps ST41 to ST44 is repeatedly executed until the evaluation value calculator 37 calculates the evaluation value for all the pixels and the area determinator 38 determines, on all the pixels, whether the pixel represents part of the object to be detected from the evaluation value (step ST45).

After finishing the above-mentioned determination on all pixels, the area determinator 38 determines, from the determination result, the area in the image in which the object to be detected exists, and outputs position information indicating spatial positions of one or more pixels belonging to the determined area.

In the Embodiment 3, determination is made for each pixel of an image frame as to whether the pixel is a pixel representing part of the object to be detected. Alternatively, a search window having a size corresponding to a plurality of pixels may be set, and determination on whether an object exists in the search window may be made.

Specifically, it is as follows.

In the Embodiment 3, a plane, on which evaluation values of individual pixels are distributed, is referred to as evaluation value plane on the assumption that the evaluation values of the pixels calculated by the evaluation value calculator 37 are distributed on the plane in a manner that the evaluation values correspond to frames of an image. Note that, in the Embodiment 2, as illustrated in FIG. 11, a plane, on which the evaluation values of individual blocks including a plurality of pixels are distributed, is referred to as evaluation value plane. Accordingly, Embodiments 2 and 3 are different from each other in targets of the evaluation values.

After the evaluation value calculator 37 calculates the evaluation value of each pixel in the image frame, the area determinator 38 sets a search window having a size corresponding to a plurality of pixels.

The shape of the search window is not particularly limited. However, when a rectangle shape is applied to the search window, longitudinal/lateral sizes of the rectangle and coordinates representing the position of an upper left corner and the like of the rectangle are used as parameters for specifying the search window.

After setting the search window, the area determinator 38 reads out an evaluation value of the pixel included in the search window from among the evaluation values of the pixels calculated by the evaluation value calculator 37, and calculates, from the readout evaluation value, a score indicating a measure of a possibility that an object exists in the search window.

The score calculated by the area determinator 38 may be, for example, a total of the evaluation values of the pixels included in the search window.

Note that, in a case of calculating the total of the evaluation values of the pixels in the search window as the score of the search window, the score becomes large as the size of the search window is larger. In order to suppress the increase in the score in proportion to the size of the search window, an average value of the evaluation values distributed on the evaluation value plane is calculated as an offset, the offset is subtracted from the evaluation values of the pixels included in the search window, and a total of the evaluation values of the pixels after subtraction of the offset may be calculated.

In a case where the search window just fits the object to be detected, the score of the search window becomes a large value. On the other hand, in a case where the search window does not include the object to be detected, or in a case where the size of the object to be detected is smaller than the size of the search window even if the search window includes the object, the score of the search window becomes a small value.

This is similar to the Embodiment 2, and relation between search windows and objects to be detected is illustrated in FIG. 12.

In FIG. 12, a search window (1) just fits with the object to be detected, and a search window (2) does not include an object to be detected.

In addition, a search window (3) indicates that an object to be detected is included but the size of the object is smaller than that of the search window.

After calculating the score of the search window, the area determinator 38 compares the score with a preset threshold value, similarly to the area determinator 6 in the Embodiment 2, determines that an object exists in the search window when the score is the threshold value or more, and stores the longitudinal/lateral sizes and the positional coordinates of the rectangle, which are the parameters for specifying the search window to the RAM 23.

When the score is less than the threshold value, it is determined that no object exists in the search window.

The threshold value may be set by, for example, calculating the scores of the search windows of an image capturing only the background without the object to be detected, and selecting a value that is slightly larger than and is about 1.2 times the largest score in the scores of all the search windows.

The example has been described, in which the threshold value is set in advance. Alternatively, for example, the threshold value may be adaptively calculated depending on the image. Since the score becomes smaller as the image of the background is more complicated, the threshold value is supposed to become smaller.

The area determinator 38 executes determination processing at all positions on the evaluation value plane while shifting the position of the search window on the evaluation value plane, similarly to the area determinator 6 in the Embodiment 2.

When the determination processing is completed at all positions on the evaluation value plane, the area determinator 38 determines, from the determination result, the area in the image in which the object to be detected exists, that is, determines the position of the search window at which the object to be detected exists, and outputs the longitudinal/lateral sizes and the positional coordinates of the rectangle, which are the parameters for specifying the search window.

The example has been described, in which the determination processing is performed at all positions on the evaluation value plane while shifting the position of the search window having a fixed size. Alternatively, a plurality of search windows having different sizes may be prepared, and the determination processing may be performed at all positions on the evaluation value plane while shifting the positions of the plurality of search windows.

In this case, even if the size of the object to be detected is unknown, it is possible to determine the area in the image in which the object to be detected exists. That is, the size of the object to be detected can be determined.

Note that, when the search windows having different sizes are used, the operation amount of the determination processing may be increased and the time required for the processing may be increased. Therefore, the number of search windows to be prepared is appropriately decided depending on the performance of the area determination processing circuitry 48 that realizes the area determinator 38 or the processor 22 in the computer that configures the area determinator 38.

The position of the object to be detected can be grasped by reference to the positional coordinates output by the area determinator 38. Further, in the case of using the plurality of search windows having different sizes, the size of the object to be detected can be grasped by reference to the longitudinal/lateral sizes of the rectangle output by the area determinator 38.

In the case where there is an error of an optical flow calculated by the optical flow calculator 2, even if the search window having the highest evaluation value is identified from among the plurality of search windows having different sizes, the degree of coincidence between the size and position of the search window having the highest evaluation value and the size and position of the object to be detected may be small.

For the above reason, the size and position of the object to be detected may not be able to be accurately grasped even by reference to the longitudinal/lateral sizes and the positional coordinates of the rectangle output by the area determinator 38.

Therefore, in the Embodiment 3, the area corrector 7 is provided to correct the area determined by the area determinator 38.

The processing contents of the area corrector 7 are similar to those of the Embodiment 2, and thus detailed description thereof is omitted.

As is apparent from the above description, according to the Embodiment 3, the optical flow predictor 36 is provided to predict the optical flow depending on the motion of the camera 11 and the spatial shape captured by the camera 11 by using the camera parameters acquired by the camera parameter acquisitor 31, the motion parameter acquired by the camera motion acquisitor 32, the positional coordinates of the camera 11 in the space acquired by the camera position acquisitor 33, and the three-dimensional map of the space where the camera 11 exists acquired by the three-dimensional map acquisitor 34, the evaluation value calculator 37 calculates, for each pixel constituting the image, the evaluation value indicating a measure of a possibility that the pixel is a pixel representing part of the object to be detected, from the optical flow output by the optical flow calculator 2, and the optical flow depending on the motion of the camera 11 and the spatial shape captured by the camera 11 output by the optical flow predictor 36, and the area determinator 38 compares the evaluation value of each pixel calculated by the evaluation value calculator 37 with the threshold value to determine the area in the image in which the object to be detected exists. Therefore, there is an effect to accurately detect the area in which the object to be detected exists even from the image captured by the image capturer 1 while moving, similarly to the above-described Embodiment 1.

Note that the invention of the present application allows free combinations of the embodiments, modifications of arbitrary structural elements of the embodiments, or omissions of arbitrary structural elements in the embodiments, within the scope of the invention.

The present invention is suitable for those that need to accurately detect an area in which an object to be detected exists even from an image captured while moving.

REFERENCE SIGNS LIST

1: Image capturer, 2: Optical flow calculator, 3: Object detector, 4: Evaluation value calculator, 5, 6: Area determinator, 7: Area corrector, 11: Camera, 12: Optical flow calculation processing circuitry, 13: Evaluation value calculation processing circuitry, 14, 15: Area determination processing circuitry, 16: Area correction processing circuitry, 21: Program memory, 22: Processor, 23: RAM, 31: Camera parameter acquisitor, 32: Camera motion acquisitor, 33: Camera position acquisitor, 34: Three-dimensional map acquisitor, 35: Three-dimensional map storage, 36: Optical flow predictor, 37: Evaluation value calculator, 38: Area determinator, 41: Camera parameter acquisition processing circuitry, 42: Motion sensor, 43: Position sensor, 44: Three-dimensional map acquisition processing circuitry, 45: Hard disk, 46: Optical flow prediction processing circuitry, 47: Evaluation value calculation processing circuitry, 48: Area determination processing circuitry

The invention claimed is:

1. An object detection device comprising:
an image capturer to continuously capture images;
an optical flow calculator to calculate, for each pixel constituting the image, an optical flow between images captured by the image capturer at different times; and
an object detector to aggregate the optical flows calculated by the optical flow calculator in a spatial direction and a time direction and detect an area in an image, in which an object to be detected exists, by using difference absolute values of arbitrary two optical flows,
wherein the object detector includes:
an evaluation value calculator to
divide the image captured by the image capturer into one or more areas,
calculate, for each divided area, a total of difference absolute values of angles of the optical flows and a total of difference absolute values of lengths of the optical flows of the pixels belonging to a corresponding divided area, and
calculate, for each divided area, an evaluation value of a corresponding divided area by using the total of difference absolute values of the angles and the total of difference absolute values of the lengths, the evaluation value indicating a measure of a possibility that the corresponding divided area is an object area representing part or whole of the object to be detected; and an area determinator to determine an area in an image, in which the object to be detected exists, by comparing the evaluation value of each divided area calculated by the evaluation value calculator with a threshold value.

2. The object detection device according to claim 1, further comprising an area corrector to correct the area detected by the object detector, wherein the area connection unit is configured to
calculate an image characteristic amount in the area detected by the object detector and an image characteristic amount in an area obtained by changing a position and a size of the detected area, and compare the calculated image characteristic amounts, and select, as a corrected area for the area detected by the object detector, any one among the area detected by the object detector and the changed area on a basis of a comparison result of the image characteristic amounts.

3. An object detection device comprising:
an image capturer to continuously capture images;
an optical flow calculator to calculate, for each pixel constituting the image, an optical flow between images captured by the image capturer at different times; and
an object detector to aggregate the optical flows calculated by the optical flow calculator in a spatial direction and a time direction and detect an area in an image, in which an object to be detected exists, by using difference absolute values of arbitrary two optical flows,
wherein the object detector includes:
an evaluation value calculator to
divide the image captured by the image capturer into one or more areas,
calculate, for each divided area, a total of difference absolute values of angles of the optical flows and a total of difference absolute values of lengths of the optical flows of the pixels belonging to a corresponding divided area, and
calculate, for each divided area, an evaluation value of a corresponding divided area by using the total of difference absolute values of the angles and the total of difference absolute values of the lengths, the evaluation value indicating a measure of a possibility that the corresponding divided area is an object area representing part or whole of the object to be detected; and
an area determinator to determine an area in an image, in which the object to be detected exists, by searching for an area in which the evaluation value of each divided area calculated by the evaluation value calculator achieves a maximum value in the image.

4. An object detection method comprising:
continuously capturing images;
calculating, for each pixel constituting the image, an optical flow between images captured at different times; and
aggregating the calculated optical flows in a spatial direction and a time direction and detecting an area in an image in which an object to be detected exists, by using difference absolute values of arbitrary two optical flows,
dividing the captured image into one or more areas,
calculating, for each divided area, a total of difference absolute values of angles of the optical flows and a total of difference absolute values of lengths of the optical flows of the pixels belonging to a corresponding divided area,
calculating, for each divided area, an evaluation value of a corresponding divided area by using the total of difference absolute values of the angles and the total of difference absolute values of the lengths, the evaluation value indicating a measure of a possibility that the corresponding divided area is an object area representing part or whole of the object to be detected; and
determining an area in an image, in which the object to be detected exists, by comparing the evaluation value of each divided area with a threshold value.

5. An object detection method comprising:
continuously capturing images;
calculating, for each pixel constituting the image, an optical flow between images captured at different times; and
aggregating the calculated optical flows in a spatial direction and a time direction and detecting an area in an image in which an object to be detected exists, by using difference absolute values of arbitrary two optical flows,
dividing the captured image into one or more areas,
calculating, for each divided area, a total of difference absolute values of angles of the optical flows and a total of difference absolute values of lengths of the optical flows of the pixels belonging to a corresponding divided area,
calculating, for each divided area, an evaluation value of a corresponding divided area by using the total of difference absolute values of the angles and the total of difference absolute values of the lengths, the evaluation value indicating a measure of a possibility that the corresponding divided area is an object area representing part or whole of the object to be detected; and
determining an area in an image, in which the object to be detected exists, by searching for an area in which the evaluation value of each divided area achieves a maximum value in the image.

6. The object detection device according to claim 3, further comprising an area corrector to correct the area detected by the object detector,
wherein the area connection unit is configured to
calculate an image characteristic amount in the area detected by the object detector and an image characteristic amount in an area obtained by changing a position and a size of the detected area, and compare the calculated image characteristic amounts, and
select, as a corrected area for the area detected by the object detector, any one among the area detected by the object detector and the changed area on a basis of a comparison result of the image characteristic amounts.

* * * * *